US012731883B2

(12) United States Patent
Li et al.

(10) Patent No.: US 12,731,883 B2
(45) Date of Patent: Sep. 8, 2026

(54) FOLDABLE ELECTRONIC DEVICE AND ANTENNA SYSTEM FOR SAME

(71) Applicant: HONOR DEVICE CO., LTD., Shenzhen (CN)

(72) Inventors: Yuanpeng Li, Shenzhen (CN); Dawei Zhou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 100 days.

(21) Appl. No.: 18/577,409

(22) PCT Filed: Aug. 27, 2022

(86) PCT No.: PCT/CN2022/115325
§ 371 (c)(1),
(2) Date: Jan. 8, 2024

(87) PCT Pub. No.: WO2023/116022
PCT Pub. Date: Jun. 29, 2023

(65) Prior Publication Data

US 2024/0250411 A1 Jul. 25, 2024

(30) Foreign Application Priority Data

Dec. 22, 2021 (CN) ......................... 202111582234.8

(51) Int. Cl.
*H01Q 1/50* (2006.01)
*H01Q 1/24* (2006.01)
*H01Q 1/52* (2006.01)

(52) U.S. Cl.
CPC ............. *H01Q 1/243* (2013.01); *H01Q 1/521* (2013.01)

(58) Field of Classification Search
CPC ........ H01Q 1/243; H01Q 1/521; H01Q 13/10; H01Q 21/28; H01Q 1/002; H01Q 1/2266;
(Continued)

(56) References Cited

U.S. PATENT DOCUMENTS 8,654,030 B1 * 2/2014 Mercer ................ H04B 1/3833 343/893
10,205,232 B2 2/2019 Sayama et al.
(Continued)

FOREIGN PATENT DOCUMENTS

CN 102570028 A * 7/2012
CN 107257016 A * 10/2017 ............. H01Q 1/521
(Continued)

*Primary Examiner* — Dimary S Lopez Cruz
*Assistant Examiner* — Bamidele A Immanuel

(57) ABSTRACT

This application provides a foldable electronic device and an antenna system for same. The antenna system includes two same-band antennas disposed on a first body, a decoupling structure connected in series between the two antennas, and a parasitic structure disposed on a second body. The two antennas are spaced apart by a gap. In a folded state, the parasitic structure at least partially overlaps both the two antennas. The parasitic structure is a ½ wavelength antenna structure. The wavelength is an operating wavelength of the two same-band antennas. In the folded state, when any one of the two antennas is operating, the parasitic structure is coupled to the any one antenna to form resonance in a ½ wavelength mode, and an induced electric field is formed between one side of a middle of the parasitic structure and a reference ground.

16 Claims, 21 Drawing Sheets

(58) Field of Classification Search
CPC ........... H01Q 1/273; H01Q 1/36; H01Q 1/48; H01Q 1/50
See application file for complete search history.

(56) References Cited

U.S. PATENT DOCUMENTS

| | | | | |
|---|---|---|---|---|
| 11,888,239 | B2 | 1/2024 | Hsu et al. | |
| 11,899,492 | B2 | 2/2024 | Lin et al. | |
| 11,984,646 | B2 | 5/2024 | Wu et al. | |
| 12,003,041 | B2 | 6/2024 | Liu | |
| 2003/0117324 | A1* | 6/2003 | Iwai | H01Q 1/362 343/702 |
| 2004/0227673 | A1* | 11/2004 | Iwai | H01Q 1/27 343/702 |
| 2005/0075082 | A1* | 4/2005 | Iwai | H01Q 1/273 455/90.3 |
| 2005/0143151 | A1* | 6/2005 | Ito | H04B 7/0871 455/575.5 |
| 2010/0245177 | A1* | 9/2010 | Jagielski | H01Q 1/243 343/702 |
| 2012/0064954 | A1* | 3/2012 | Kato | H01Q 1/243 343/751 |
| 2014/0266937 | A1* | 9/2014 | Mahanfar | H01Q 1/521 343/726 |
| 2015/0061962 | A1* | 3/2015 | Lee | H01Q 9/42 343/893 |
| 2015/0116168 | A1* | 4/2015 | Yosui | H01Q 5/328 343/722 |
| 2017/0110786 | A1* | 4/2017 | Liu | G06F 1/1641 |
| 2017/0142241 | A1* | 5/2017 | Kim | H01Q 1/22 |
| 2018/0097276 | A1* | 4/2018 | Yamagajo | G06K 19/07786 |
| 2018/0366813 | A1* | 12/2018 | Kim | H01Q 9/04 |
| 2019/0140342 | A1* | 5/2019 | Lim | H01Q 1/243 |
| 2019/0181891 | A1 | 6/2019 | Harper | |
| 2020/0287274 | A1* | 9/2020 | Zhang | H04M 1/0214 |
| 2021/0111480 | A1* | 4/2021 | Zhong | H01Q 1/2291 |
| 2021/0119336 | A1* | 4/2021 | Sun | H01Q 5/35 |
| 2021/0318720 | A1* | 10/2021 | Lin | H01Q 1/243 |
| 2021/0320410 | A1* | 10/2021 | Liu | G06F 1/1677 |
| 2021/0328329 | A1* | 10/2021 | Kim | H04M 1/0214 |
| 2022/0115768 | A1* | 4/2022 | Oh | H01Q 5/328 |
| 2022/0123469 | A1* | 4/2022 | Hsu | H01Q 1/243 |
| 2022/0223999 | A1* | 7/2022 | Wu | H01Q 9/42 |
| 2022/0407217 | A1 | 12/2022 | Wang et al. | |
| 2023/0094721 | A1* | 3/2023 | Hsu | H01Q 5/328 343/702 |
| 2023/0141980 | A1* | 5/2023 | Tsai | H01Q 5/378 343/893 |
| 2023/0163457 | A1* | 5/2023 | Tsai | H01Q 1/243 343/893 |
| 2023/0283698 | A1 | 9/2023 | Wang et al. | |
| 2023/0344149 | A1* | 10/2023 | Wen | H01Q 9/0428 |
| 2023/0361467 | A1* | 11/2023 | Wu | H01Q 9/42 |
| 2024/0235027 | A9* | 7/2024 | Zhou | H01Q 1/521 |
| 2024/0313410 | A1* | 9/2024 | Zhou | H01Q 1/243 |
| 2024/0347903 | A1* | 10/2024 | Xue | H01Q 1/243 |
| 2025/0096453 | A1* | 3/2025 | Cai | H01Q 1/2266 |

FOREIGN PATENT DOCUMENTS

| | | | | | |
|---|---|---|---|---|---|
| CN | 108879116 | A | * | 11/2018 | H01Q 5/28 |
| CN | 109725680 | A | | 5/2019 | |
| CN | 110233326 | A | | 9/2019 | |
| CN | 210489828 | U | | 5/2020 | |
| CN | 111276806 | A | * | 6/2020 | H01Q 23/00 |
| CN | 111384581 | A | | 7/2020 | |
| CN | 111613873 | A | | 9/2020 | |
| CN | 108780941 | B | * | 10/2020 | H01Q 1/27 |
| CN | 112151960 | A | | 12/2020 | |
| CN | 112436265 | A | | 3/2021 | |
| CN | 112467387 | A | * | 3/2021 | H01Q 1/36 |
| CN | 112751159 | A | | 5/2021 | |
| CN | 111512498 | B | | 8/2021 | |
| CN | 113451771 | A | * | 9/2021 | H01Q 1/50 |
| CN | 113454843 | A | | 9/2021 | |
| CN | 113517546 | A | | 10/2021 | |
| CN | 113644436 | A | | 11/2021 | |
| CN | 113764885 | A | | 12/2021 | |
| CN | 114899599 | A | * | 8/2022 | H01Q 1/22 |
| EP | 3920327 | A1 | | 12/2021 | |
| WO | 2015182677 | A1 | | 12/2015 | |
| WO | 2020171580 | A1 | | 8/2020 | |

* cited by examiner

FOLDABLE ELECTRONIC DEVICE AND ANTENNA SYSTEM FOR SAME

This application is a national stage of International Application No. PCT/CN2022/115325, filed on Aug. 27, 2022, which claims priority to Chinese Patent Application No. 202111582234.8, filed on Dec. 22, 2021. The disclosures of each of the aforementioned applications are hereby incorporated by reference in their entireties.

TECHNICAL FIELD

This application relates to the field of wireless communication technologies, and in particular to a foldable electronic device and an antenna system for same.

BACKGROUND

After electronic devices such as mobile phones enter a smart era, to obtain better user experience, appearances of the electronic devices have undergone changes from large screens to full screens and then to foldable screens. Such foldable electronic devices bring a new challenge to antenna design. Antenna performance and an isolation of an antenna in a mid band or low band existing when the electronic device is in a folded state is significantly poorer than antenna performance and an isolation of an antenna in a mid band or low band existing when the electronic device is in an unfolded state. Therefore, how to resolve a problem of reduction of the antenna performance and the isolation in the folded state has become an important research topic in the field of antenna design.

SUMMARY

This application provides a foldable electronic device and an antenna system for same. The antenna system includes a parasitic structure capable of forming resonance in a half-wavelength mode. This can effectively resolve a problem of a poor isolation between two same-band antennas included in the antenna system existing when the electronic device is in an unfolded state and a folded state.

According to a first aspect, this application provides an antenna system. The antenna system is used in a foldable electronic device. The foldable electronic device includes a first body and a second body that are connected to each other and are capable of being folded or unfolded relative to each other. The antenna system includes two same-band antennas, a decoupling structure, and a parasitic structure. The two same-band antennas are disposed on the first body, and the two same-band antennas are spaced apart by a first gap. The decoupling structure is connected in series between the two same-band antennas. The parasitic structure is disposed on the second body, and the parasitic structure at least partially overlaps both the two same-band antennas when the electronic device is in a folded state. The parasitic structure is a ½ wavelength antenna structure. The wavelength is an operating wavelength of the two same-band antennas.

In the antenna system provided in this application, the two same-band antennas are disposed on a same side of the foldable electronic device, and the decoupling structure is connected in series between the two same-band antennas. Therefore, the decoupling structure is used to cut off a coupling path that is between the two same-band antennas and that passes through the first gap. This may effectively resolve a problem that a poor isolation exists between the two same-band antennas when the electronic device is in an unfolded state. For the antenna system, a ½ wavelength antenna structure, that is, a parasitic structure, is added on the other side of the electronic device. When the electronic device is in the folded state, the parasitic structure and the two same-band antennas are coupled to form resonance in a half-wavelength mode. A direction of an induced electric field formed between one side of a middle of the parasitic structure and a reference ground near the parasitic structure and a direction of an induced electric field formed between the other side of the middle of the parasitic structure and the reference ground near the parasitic structure are opposite to each other. The induced electric field may offset an electric field coupled from any one of the two same-band antennas to the other antenna, to suppress radiated energy on any one of the two same-band antennas from being coupled to the other antenna through a second reference ground on the second body, and further increase an isolation between the first antenna and the second antenna. This may effectively resolve a problem that a poor isolation exists between the two same-band antennas when the electronic device is in a folded state. In this way, a high isolation exists between the two same-band antennas of the antenna system, and the two same-band antennas have ideal antenna performance when the electronic device is in the unfolded state or folded state. This enables the electronic device including the antenna system to have a relatively good wireless communication function.

In an implementation, the two same-band antennas include a first antenna and a second antenna. The first antenna includes a first radiating branch. The second antenna includes a second radiating branch. The first radiating branch and the second radiating branch are spaced apart by the first gap. The parasitic structure includes a parasitic branch. When the electronic device is in a fully folded state, the parasitic branch overlaps the first radiating branch and the second radiating branch.

In an implementation, when the electronic device is in the fully folded state, a middle of the parasitic branch is opposite to the first gap, and a distance from a projection of a center of the first gap on the parasitic branch to the middle of the parasitic branch is less than or equal to one-eighth of an operating wavelength of the two same-band antennas.

In an implementation, the parasitic branch includes a first radiator and a second radiator located on both sides of the middle of the parasitic branch. When the electronic device is in the folded state, the first radiator overlaps the first radiating branch, and the second radiator overlaps the second radiating branch.

In an implementation, the first radiating branch and the second radiating branch are separately spaced apart from a first reference ground on the first main body by the first slot, and the parasitic branch is spaced apart from a second reference ground on the second body by a second slot. When the electronic device is in the folded state, the first slot is opposite to the second slot.

In an implementation, when the electronic device is in the folded state and any one of the two same-band antennas is operating, the parasitic structure is coupled to the operating antenna to form resonance in a half-wavelength mode. Directions of induced currents respectively generated on the first radiator and the second radiator are the same. A direction of an induced electric field generated in the second slot between the first radiator and the second reference ground is opposite to a direction of an induced electric field generated in the second slot between the second radiator and the second reference ground.

In an implementation, when the electronic device is in the folded state and any one of the two same-band antennas is operating, an electric field in the first slot generated by exciting the operating antenna and an electric field in the first slot generated by inducing the other of the two same-band antennas are electric fields in a same direction.

In an implementation, the parasitic structure is a linear antenna, and the first radiator and the second radiator are an integral structure. A length of the parasitic branch is half of the operating wavelength of the two same-band antennas.

In an implementation, the linear antenna further includes two matching circuits respectively coupled to both ends of the parasitic branch. The two matching circuits are configured to adjust a resonant frequency of the parasitic structure. This enables an induced electric field generated by coupling the parasitic structure and the two same-band antennas to be efficiently offset by induced electric fields that are generated by the two same-band antennas, to achieve a purpose of suppressing coupling radiated energy on any one of the two same-band antennas to the other antenna.

In an implementation, the parasitic structure is a slot antenna, and the first radiator and the second radiator are spaced apart by a gap. One end, away from the second radiator, of the first radiator is grounded. One end, away from the first radiator, of the second radiator is grounded. A length of the first radiator or the second radiator is a quarter of the operating wavelength of the two same-band antennas.

In an implementation, the first radiating branch includes a first coupling end adjacent to the first gap, and the second radiating branch includes a second coupling end adjacent to the first gap. The decoupling structure is connected in series between the first coupling end of the first radiating branch and the second coupling end of the second radiating branch. The decoupling structure is configured to cut off a coupling path that is between the two same-band antennas and that passes through the first gap.

In an implementation, the decoupling structure is a band-stop filter. The band-stop filter includes an inductance element, or a combination of an inductor and a capacitor.

In an implementation, the first antenna further includes a first feed point and a first grounding point that are coupled to the first radiating branch. A minimum distance from the first feed point to a center of the first gap is less than a minimum distance from the first grounding point to the center of the first gap. The second antenna further includes a second feed point and a second grounding point that are coupled to the second radiating branch. A minimum distance from the second feed point to the center of the first gap is greater than a minimum distance from the second grounding point to the center of the first gap.

In an implementation, the first antenna further includes a first matching circuit coupled to the first feed point. The first matching circuit is configured to implement impedance matching of the first antenna, to reduce signal energy loss and improve radiation efficiency of the first antenna. This enables the first antenna to obtain more ideal antenna performance. The second antenna further includes a second matching circuit coupled to the second feed point. The second matching circuit is configured to implement impedance matching of the second antenna, to reduce signal energy loss and improve radiation efficiency of the second antenna. This enables the second antenna to obtain more ideal antenna performance.

In an implementation, the second antenna further includes a third matching circuit coupled to the second grounding point. The third matching circuit is configured to implement impedance matching of the second antenna, to improve the antenna performance of the second antenna.

In an implementation, the first body further includes a first middle frame. The first middle frame is partly or entirely made of a metal material. Both the first radiating branch and the second radiating branch are parts of a structure of the first middle frame.

The second body further includes a second middle frame. The first middle frame overlaps the second middle frame when the electronic device is in a fully folded state. The second middle frame is partially or entirely made of a metal material. The parasitic branch is a part of a structure of the second middle frame.

According to a second aspect, this application provides a foldable electronic device. The foldable electronic device includes a first body, a second body, and the antenna system that is described in the first aspect. The first body and the second body are connected to each other and are capable of being folded or unfolded relative to each other. Two same-band antennas included in the antenna system are disposed on the first body, and a parasitic structure included in the antenna system is disposed on the second body.

In the foldable electronic device, for the antenna system, the two same-band antennas are disposed on a same side of the foldable electronic device, and a decoupling structure is connected in series between the two same-band antennas. Therefore, the decoupling structure is used to cut off a coupling path that is between the two same-band antennas and that passes through the first gap. This may effectively resolve a problem that a poor isolation exists between the two same-band antennas when the electronic device is in an unfolded state. For the antenna system, a ½ wavelength antenna structure, that is, the parasitic structure, is added on the other side of the electronic device. When the electronic device is in the folded state, the parasitic structure and the two same-band antennas are coupled to form resonance in a half-wavelength mode. A direction of an induced electric field formed between one side of a middle of the parasitic structure and a reference ground near the parasitic structure and a direction of an induced electric field formed between the other side of the middle of the parasitic structure and the reference ground near the parasitic structure are opposite to each other. The induced electric field may offset an electric field coupled from any one of the two same-band antennas to the other antenna, to suppress radiated energy on any one of the two same-band antennas from being coupled to the other antenna through a second reference ground on the second body, and further increase an isolation between the first antenna and the second antenna. This may effectively resolve a problem that a poor isolation exists between the two same-band antennas when the electronic device is in a folded state. In this way, a high isolation exists between the two same-band antennas of the antenna system, and the two same-band antennas have ideal antenna performance when the electronic device is in the unfolded state or folded state. This enables the electronic device including the antenna system to have a relatively good wireless communication function.

BRIEF DESCRIPTION OF DRAWINGS

To describe technical solutions in implementations of this application more clearly, the following briefly describes accompanying drawings to be used in the implementations of this application. Apparently, the accompanying drawings in the following description show merely some implementations of this application, and a person of ordinary skill in the art can derive another accompanying drawing from these accompanying drawings without creative efforts.

Figure 19:
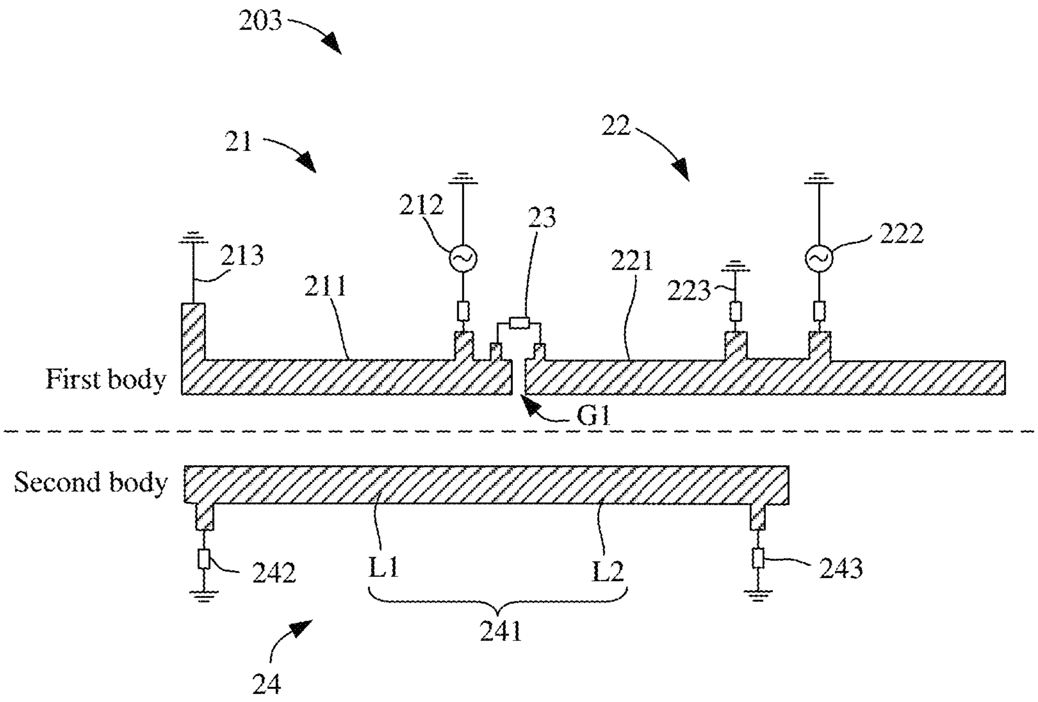
FIG. 19 is a schematic diagram of an equivalent structure of an antenna system according to a third implementation.
Figure 22A:
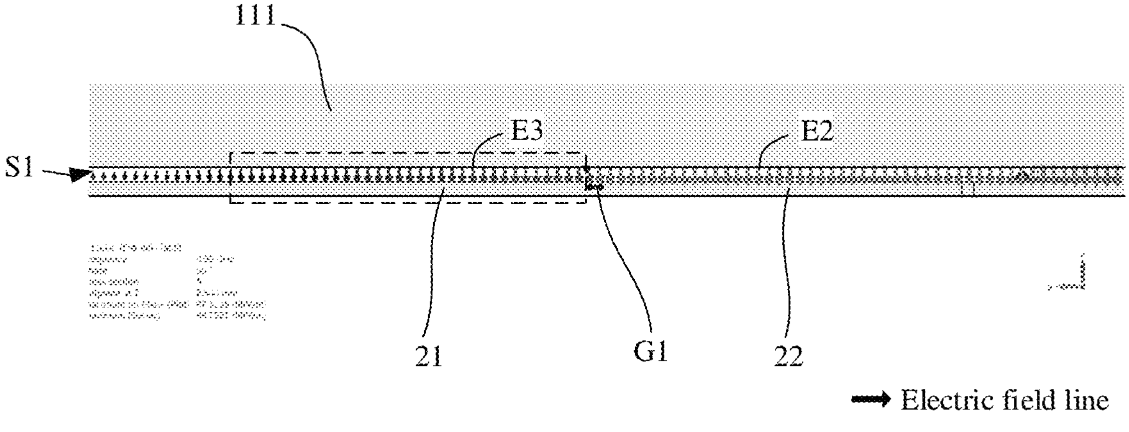
FIG. 22A is a diagram of simulation of electric field distribution formed in a first slot between two same-band antennas included in the antenna system shown in FIG. 19 and a first reference ground on a first body when an electronic device is in a folded state and a second antenna is excited.
Figure 22B:
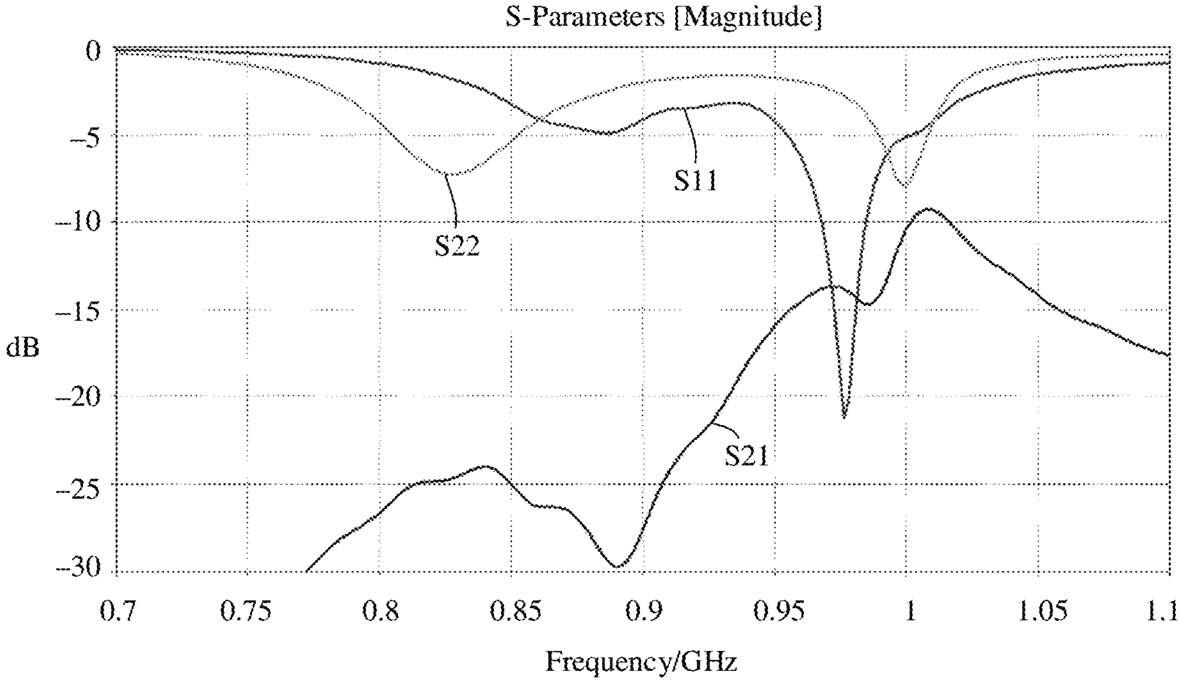
Figure 23:
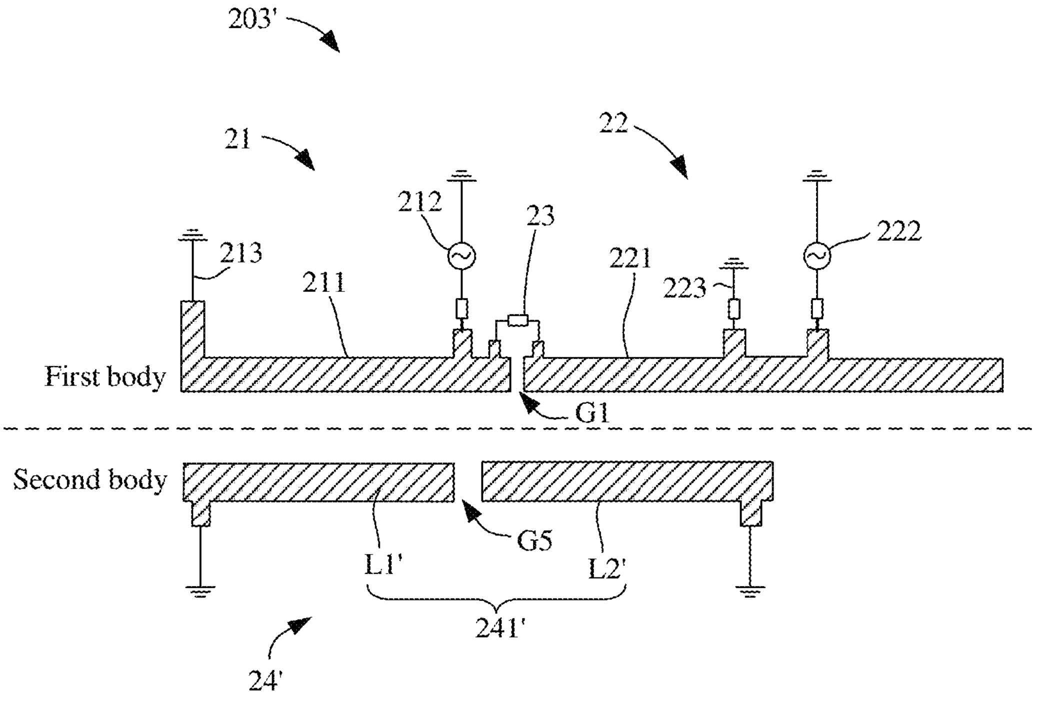
Figure 24:
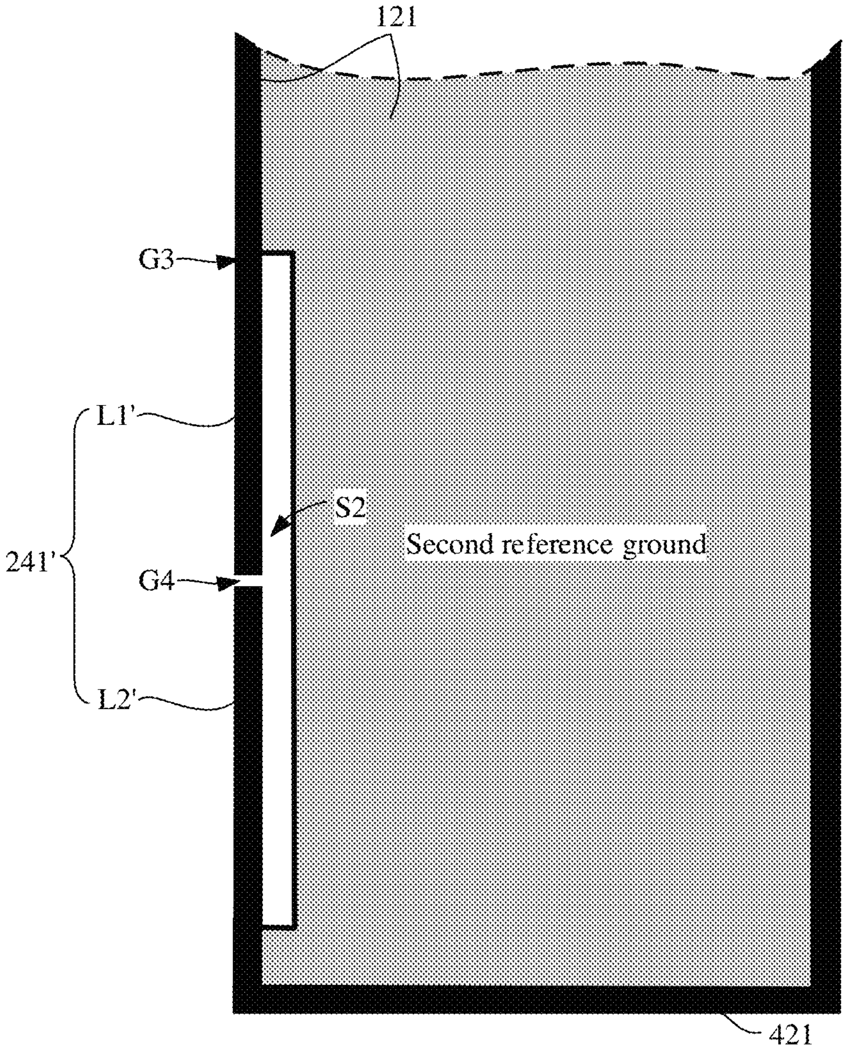
Figure 25:
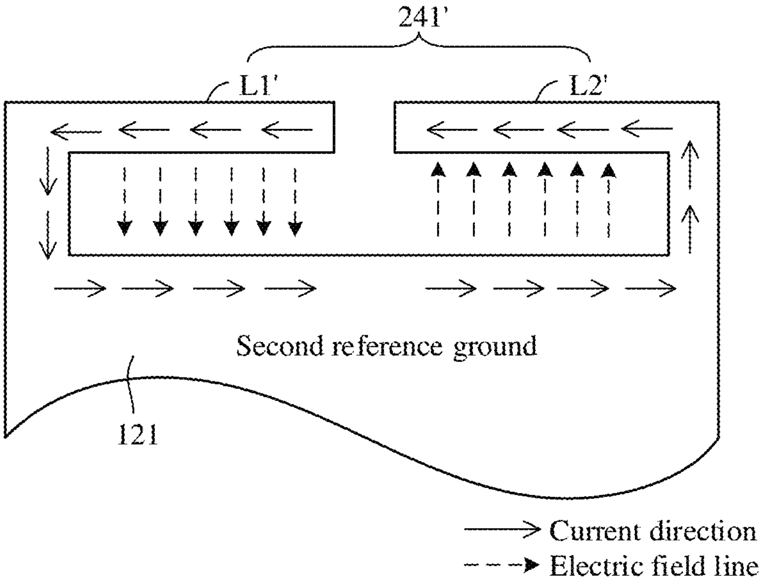

FIG. 22B is a schematic diagram of S-parameter curves of two same-band antennas included in the antenna system shown in FIG. 19 when an electronic device is in a folded state;

FIG. 23 is a schematic diagram of another equivalent structure of an antenna system according to the third implementation;

FIG. 24 is a schematic top view of a position at which a parasitic structure included in the antenna system shown in FIG. 23 is disposed on a second body; and FIG. 25 is a schematic diagram of a principle of current distribution and electric field distribution generated when a parasitic structure shown in FIG. 23 is excited.

REFERENCE NUMERALS OF MAIN COMPONENTS

| | |
|---|---|
| Electronic device | 100 |
| First body | 11 |
| First reference ground | 111 |
| Second body | 12 |
| Second reference ground | 121 |
| Connecting part | 13 |
| Display | 14 |
| First display | 141 |
| Second display | 142 |
| Antenna system | 200, 201, 202, 203 |
| Antenna | 20 |
| First antenna | 21 |
| First radiating branch | 211 |
| First feed point | 212 |
| First grounding point | 213 |
| First feed branch | 214 |
| First grounding branch | 215 |
| First matching circuit | 216 |
| First coupling end | 217 |
| Second antenna | 22 |
| Second radiating branch | 221 |
| Second feed point | 222 |
| Second grounding point | 223 |
| Second feed branch | 224 |
| Second grounding branch | 225 |
| Second matching circuit | 226 |
| Third matching circuit | 227 |
| Second coupling end | 228 |
| Decoupling structure | 23 |
| Parasitic structure | 24, 24' |
| Linear antenna | 24 |
| Slot antenna | 24' |
| Parasitic branch | 241, 241' |
| First radiator | L1, L1' |
| Second radiator | L2, L2' |
| Fourth matching circuit | 242 |
| Fifth matching circuit | 243 |
| Radio frequency module | 25 |
| Processor | 31 |
| Memory | 32 |
| Power supply module | 33 |
| Another input/output device | 34 |
| Housing | 40 |
| Middle frame | 41 |
| First middle frame | 411 |
| First subsection | T1 |
| Second subsection | T2 |
| Third subsection | T3 |
| Second middle frame | 412 |
| Fourth subsection | T4 |
| Fifth subsection | T5 |
| Sixth subsection | T6 |
| Rear cover | 42 |
| First rear cover | 421 |
| Second rear cover | 422 |

-continued

| | |
|---|---|
| Internal structure | 50 |
| First circuit board assembly | 511 |
| First battery cell | 512 |
| Second circuit board assembly | 521 |
| Second battery cell | 522 |
| Middle gap | G0 |
| First gap | G1 |
| Second gap | G2 |
| Third gap | G3 |
| Fourth gap | G4 |
| Fifth gap | G5 |
| First slot | S1 |
| Second slot | S2 |
| First coupling path | P1 |
| Second coupling path | P2 |
| First edge region | A |
| Second edge region | B |
| First electric field | E1 |
| Second electric field | E2 |
| Third electric field | E3 |
| Fourth electric field | E4 |
| Fifth electric field | E5 |
| Sixth electric field | E6 |
| Seventh electric field | E7 |

This application is further described with reference to the accompanying drawings in the following implementations.

DESCRIPTION OF EMBODIMENTS

The following clearly and completely describes technical solutions in implementations of this application with reference to accompanying drawings in the implementations of this application. The accompanying drawings are for illustrative purposes only, represent only schematic diagrams, and should not be construed as limiting this application. Apparently, described implementations are merely some but not all of implementations of this application. All other implementations obtained by a person of ordinary skill in the art based on the implementations of this application without creative efforts shall fall within the protection scope of this application.

Unless otherwise defined, all technical and scientific terms used in this application have same meanings as meanings usually understood by a person skilled in the art. Terms used in this specification of this application are merely for describing specific implementations, and are not intended to limit this application.

This application provides a foldable electronic device. The electronic device includes a first body and a second body that may be folded or unfolded relative to each other, and an antenna system. The antenna system includes two same-band antennas disposed on the first body, a decoupling structure connected in series between the two same-band antennas, and a parasitic structure disposed on the second body. The two same-band antennas are spaced apart by a first gap. When the electronic device is in a folded state, the parasitic structure at least partially overlaps both the two same-band antennas. The decoupling structure is connected in series between the two same-band antennas. The antenna system uses the decoupling structure to cut off a coupling path that is between the two same-band antennas and that passes through the first gap. This may effectively resolve a problem that a poor isolation exists between the two same-band antennas when the electronic device is in an unfolded state. The parasitic structure is a ½ wavelength antenna structure. The wavelength is an operating wavelength of the two same-band antennas. When the electronic device is in the folded state and any one of the two same-band antennas is operating, the antenna system uses the parasitic structure to be coupled to an operating antenna, to form resonance in a half-wavelength mode. A direction of an induced electric field formed between one side of a middle of the parasitic structure and a reference ground near the parasitic structure and a direction of an induced electric field formed between the other side of the middle of the parasitic structure and the reference ground near the parasitic structure are opposite to each other. The induced electric field is used to offset an electric field coupled from an operating antenna to the other of the two same-band antennas, to suppress radiated energy on any one of the two same-band antennas from being coupled to the other antenna through a second reference ground on the second body, and further increase an isolation between the first antenna and the second antenna. This may effectively resolve a problem that a poor isolation exists between the two same-band antennas when the electronic device is in a folded state. In this way, a high isolation exists between the two same-band antennas of the antenna system, and the two same-band antennas have ideal antenna performance when the electronic device is in the unfolded state or folded state. This enables the electronic device including the antenna system to have a relatively good wireless communication function.

Figure 1:
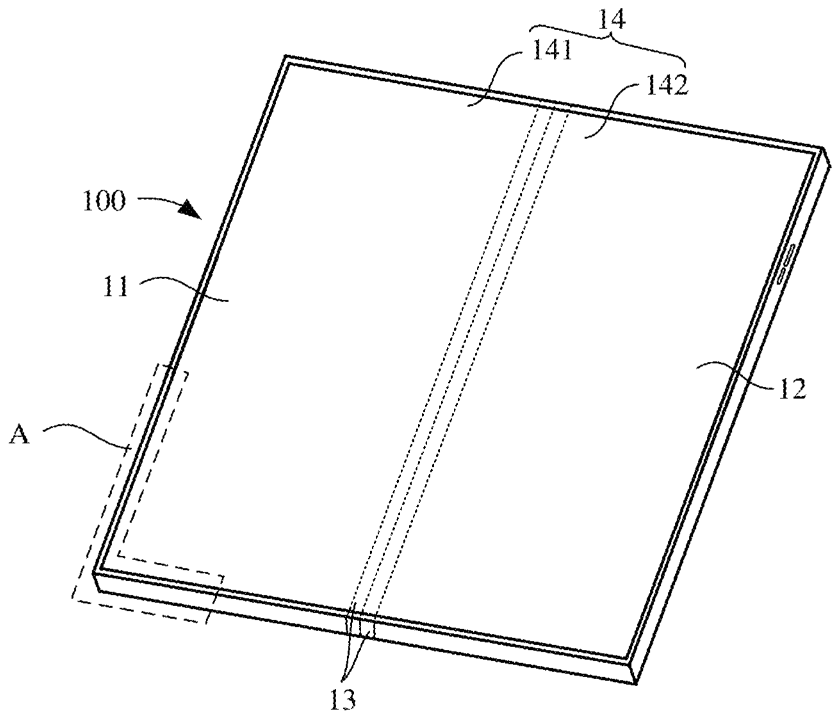
FIG. 1 is a schematic diagram of a structure of a foldable electronic device according to an implementation of this application, where the electronic device is in an unfolded state.
Figure 2:
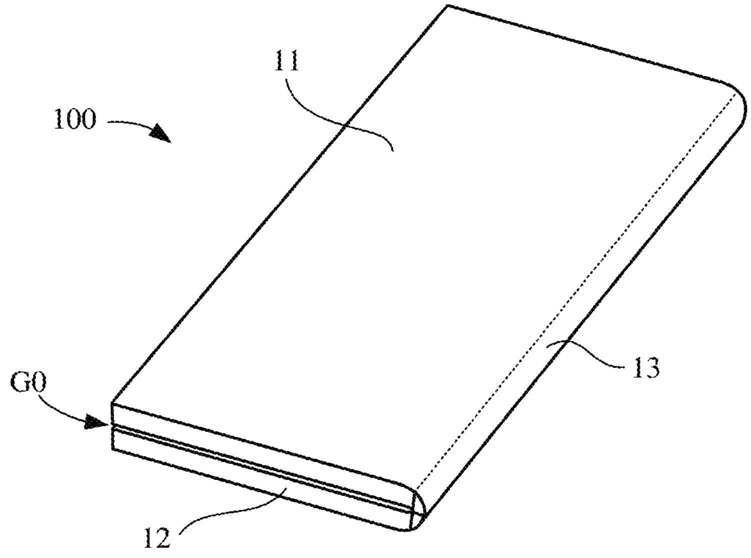
FIG. 2 is a schematic diagram of a structure of the electronic device shown in FIG. 1 in a folded state.

FIG. 1 and FIG. 2 show schematic diagrams of a structure of the foldable electronic device 100 according to implementations of this application. The electronic device 100 includes, but is not limited to, electronic apparatuses such as a mobile phone, a tablet computer, and a wearable device.

As shown in FIG. 1 and FIG. 2, the electronic device 100 includes a first body 11 and a second body 12 that are connected to each other. In the implementations, the electronic device 100 further includes a connecting part 13 disposed between the first body 11 and the second body 12. The first body 11 and the second body 12 are connected through the connecting part 13, and may be folded or unfolded relative to each other through the connecting part 13. This enables the electronic device 100 to have two use modes. FIG. 1 shows a schematic diagram of a structure of the electronic device 100 in a use mode in an unfolded state. FIG. 2 shows a schematic diagram of a structure of the electronic device 100 in a use mode in a folded state. As shown in FIG. 2, when the electronic device 100 is in the folded state, a middle gap G0 is formed between the first body 11 and the second body 12.

The electronic device 100 may further be provided with a connecting structure (not shown) on the connecting part 13 between the first body 11 and the second body 12, such as a rotating shaft or a hinge structure. The first body 11 and the second body 12 are connected through the connecting structure, and may be rotated through the connecting structure, to enable the first body 11 and the second body 12 to switch between a relatively folded state and a relatively unfolded state.

In the implementations, the electronic device 100 further includes a display 14 disposed on the first body 11 and the second body 12. The display 14 is used to display a visual output to a user. The visual output may include a graph, a text, an icon, a video, and the like. The display 14 may include a first display 141 and a second display 142. The first display 141 may be disposed on the first body 11, and the second display 142 may be disposed on the second body 12. Optionally, one of the first display 141 and the second display 142 may be set as a main screen, and the other display may be set as a secondary screen.

In an implementation, the first display 141 and the second display 142 are coupled to each other, to enable the display 14 to be continuously disposed on a same side of the first body 11 and the second body 12. In this way, the first display 141 and the second display 142 may form a complete plane when the electronic device 100 is fully unfolded. This enables the electronic device 100 to have a continuous large-area display when in the unfolded state, to achieve a function of displaying on a large screen, and meet a requirement of the user for displaying on a large screen. The electronic device 100 has a small-area display when in a folded state, to meet a requirement of the user for ease of portability.

The display 14 may be a flexible screen. The display 14 may be hidden on an inner side of the electronic device 100 when the electronic device 100 is in the folded state, or may be exposed on an outer side of the electronic device 100. A type of the display 14 and a manner in which the display 14 is presented when the electronic device 100 is in the folded state are not limited in this application. In FIG. 2, for example, the display 14 is exposed on an outer side of the electronic device 100 when the electronic device 100 is in the folded state.

Figure 3:
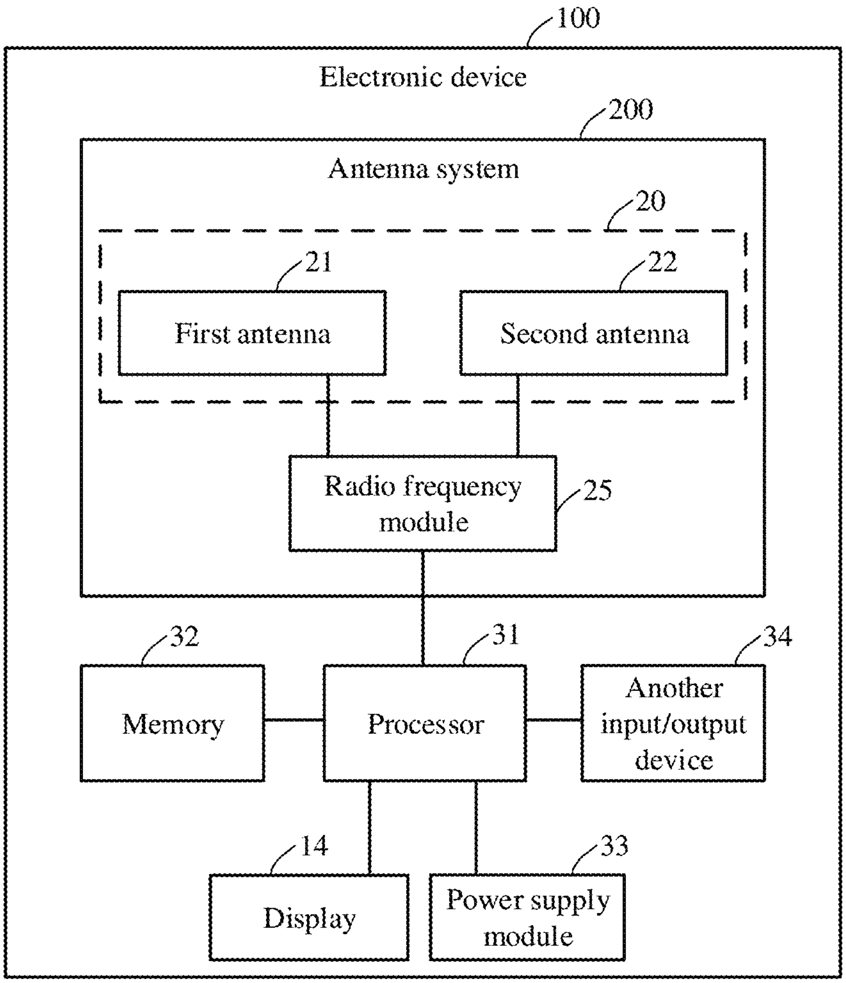
FIG. 3 is a schematic diagram of a structure of functional modules of the electronic device shown in FIG. 1, where the electronic device includes an antenna system, and the antenna system includes at least two same-band antennas: a first antenna and a second antenna.

FIG. 3 shows a schematic diagram of a structure of functional modules of the electronic device 100. As shown in FIG. 3, in addition to the display 14, the electronic device 100 may further include a processor 31, a memory 32, a power supply module 33, and another input/output device 34.

The processor 31 serves as a logic operation and control center of the electronic device 100, and is mainly responsible for functions such as data collection, data conversion, data processing, logic operation, communication, and execution of drive output. The processor 31 may include a plurality of input/output ports. The processor 31 may communicate and exchange information with another functional module or external device through the plurality of input/output ports, to implement functions such as driving and control of the electronic device 100.

The memory 32 may be accessed by the processor 31 or a peripheral interface (not shown), to implement data storage, calling, or the like. The memory 32 may include a high-speed random access memory, and may also include a non-volatile memory, such as one or more magnetic disk storage devices, flash memory devices, or other volatile solid-state storage devices.

The power supply module 33 is configured to supply power to other functional modules of the electronic device 100 and perform power management, to enable the other functional modules of the electronic device 100 to operate normally.

The another input/output device 34 may include devices for implementing functions supported by the electronic device 100, such as a speaker, a touch pad, a camera, a function key, an I/O port, and the like, to implement interaction between the electronic device 100 and a user.

In this implementation, the electronic device 100 further has a wireless communication function. Correspondingly, the electronic device 100 further includes an antenna system 200, and the antenna system 200 includes at least an antenna 20 and a radio frequency module 25. The antenna 20 may be coupled to the radio frequency module 25 through a transmission element (not shown), such as a coaxial cable or a microstrip line, to implement wireless signal transmission, establishing communication between the electronic device 100 and another network device. In the electronic device 100, to meet a requirement of the user for using various wireless communication technologies, the antenna 20 usually includes a plurality of antenna elements. Each antenna element may be configured to cover a single or a plurality of communication bands. Different antenna elements may be multiplexed to increase a utilization rate of the antenna. The plurality of antenna elements may be distributed on the first body 11 and/or the second body 12, and there are various types of antennas, such as a monopole (monopole) antenna, a dipole (dipole) antenna, an inverted F-shaped antenna (inverted F-shaped antenna, IFA), a left-handed antenna, and the like.

It may be understood that the electronic device 100 may further include a circuit board assembly (not shown) disposed inside the first body 11 and/or the second body 12. The circuit board assembly is configured to dispose an electronic component included in the electronic device 100, such as the radio frequency module 25, the processor 31, and the memory 32. The circuit board assembly may be a flexible circuit board assembly or a rigid-flex circuit board assembly.

Figure 4:
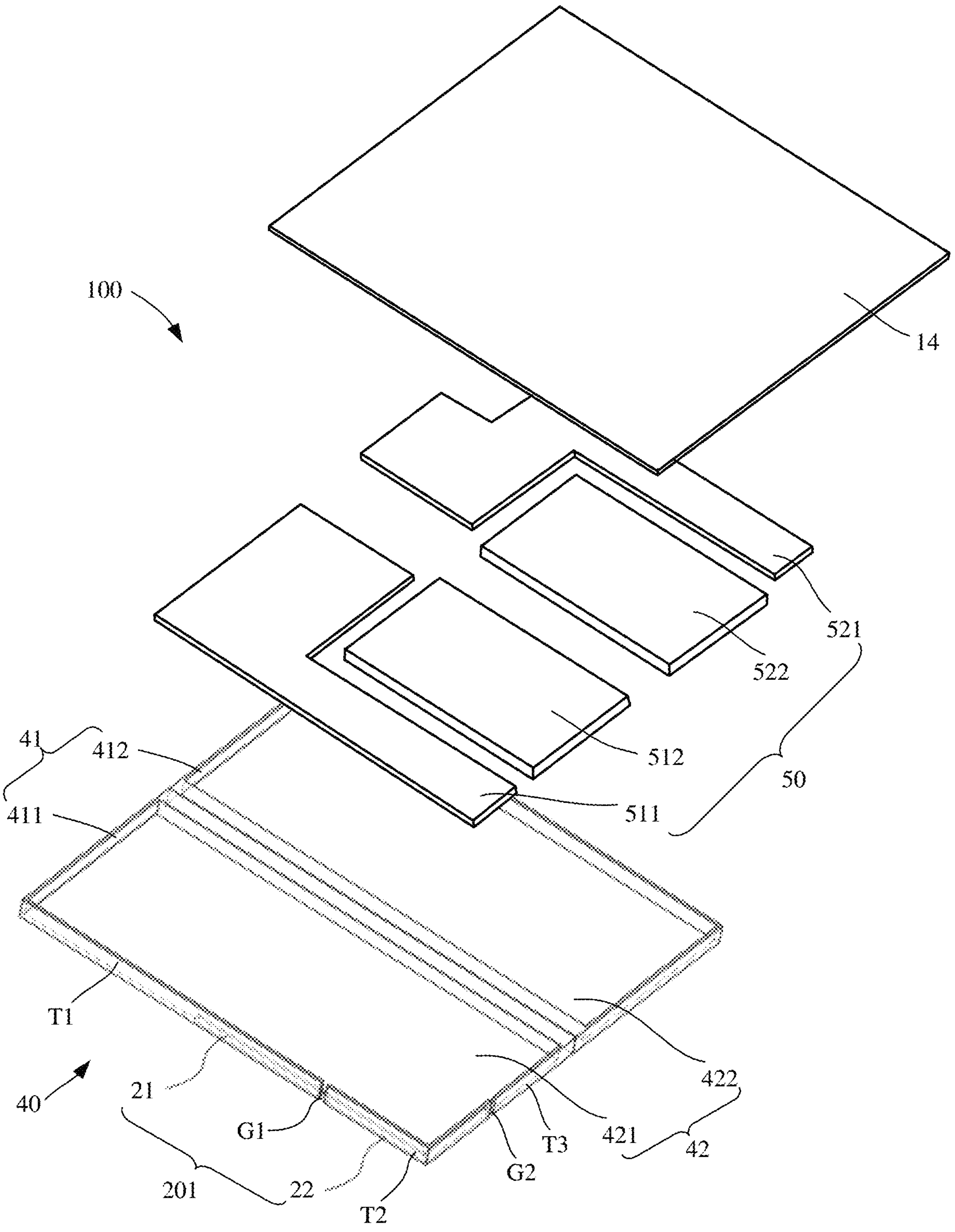
FIG. 4 is a schematic diagram of an exploded structure of the electronic device shown in FIG. 1.

FIG. 4 shows a schematic diagram of an exploded structure of the electronic device 100. As shown in FIG. 4, the electronic device 100 includes at least a display 14, a housing 40, and an internal structure 50 in an accommodating cavity surrounded by the display 14 and the housing 40.

Specifically, the housing 40 includes a middle frame 41 and a rear cover 42. The middle frame 41 is connected to at least an edge region of the rear cover 42. The middle frame 41 includes a first middle frame 411 corresponding to the first body 11 and a second middle frame 412 corresponding to the second body 12. The rear cover 42 includes a first rear cover 421 corresponding to the first body 11 and a second rear cover 422 corresponding to the second body 12. An entirety formed by the first middle frame 411 and the first rear cover 421, and an entirety formed by the second middle frame 412 and the second rear cover 422 may be connected through the connecting part 13.

Figure 5:
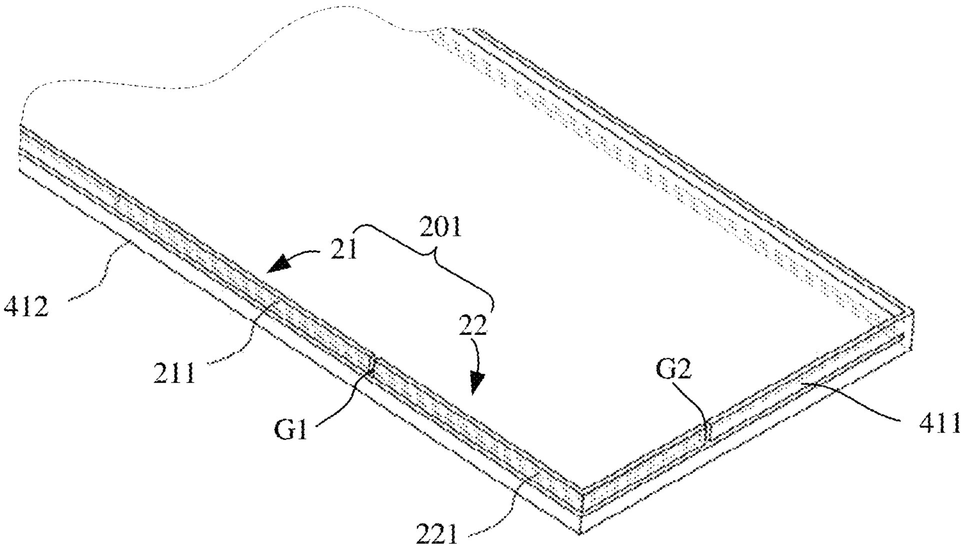
FIG. 5 is a schematic diagram of positions at which two same-band antennas included in an antenna system are disposed on a housing of an electronic device in a folded state according to a first implementation of this application.

Refer to FIG. 4 and FIG. 5. When the electronic device 100 is in a fully folded state, the first body 11 overlaps the second body 12. This enables the first middle frame 411 to overlap the second middle frame 412, and the first rear cover 421 to overlap the second rear cover 422. The antenna 20 may be disposed on the middle frame 41 and/or the rear cover.

Still refer to FIG. 4. In this implementation, the internal structure 50 includes but is not limited to a first circuit board assembly 511 and a first battery cell 512 that are corresponding to the first body 11, and a second circuit board assembly 521 and a second battery cell 522 that are corresponding to the second body 12. The first circuit board assembly 511 is configured to dispose an electronic component included in the first body 11, and the second circuit board assembly 521 is configured to dispose an electronic component included in the second body 12. The first battery cell 512 and the second battery cell 522 are configured to provide power for electronic components disposed on the first body 11 and/or the second body 12. In another implementation, the electronic device 100 may further include one battery cell or more than two battery cells.

It may be understood that the electronic device 100 shown in FIG. 3 and FIG. 4 is only an example of the electronic device, and the electronic device 100 may have more or fewer components shown in FIG. 3 and FIG. 4, may have a combination of two or more components, or may have a different component configuration.

Still refer to FIG. 3. In this implementation, the antenna system 200 includes at least a first antenna 21 and a second antenna 22. The first antenna 21 and the second antenna 22 are two same-band antennas. The first antenna 21 and the second antenna 22 are disposed in an edge region of the electronic device 100, for example, are disposed on the middle frame 41 or at a part, close to the middle frame 41, of the rear cover 42. In this application, for example, the first antenna 21 and the second antenna 22 are both disposed in a first edge region A (as shown in FIG. 1) of the first body 11, to describe a structure of the antenna system 200.

FIG. 4 and FIG. 5 show diagrams of positions at which two same-band antennas included in an antenna system 201 are disposed on a housing 40 of the electronic device 100 according to a first implementation. As shown in FIG. 4 and FIG. 5, the first antenna 21 and the second antenna 22 are both disposed on a first middle frame 411 corresponding to the first body 11, and the first antenna 21 and the second antenna 22 are spaced apart by a first gap G1.

Specifically, the first antenna 21 includes a first radiating branch 211, and the second antenna 22 includes a second radiating branch 221. The first radiating branch 211 and the second radiating branch 221 are spaced apart by the first gap G1.

In the first implementation, the first middle frame 411 may be partially or entirely made of a metal material, and both the first radiating branch 211 and the second radiating branch 221 are parts of a structure of the first middle frame 411.

Optionally, in another implementation, the first middle frame 411 may be partially or entirely made of a non-conductive material (such as glass or plastic), and the first radiating branch 211 and the second radiating branch 221 are both attached to an inner side of the first middle frame 411.

Optionally, in another implementation, the first rear cover 421 may be made of a metal material, and both the first radiating branch 211 and the second radiating branch 221 are parts of a structure of the first rear cover 421. For example, the first radiating branch 211 and the second radiating branch 221 may be cut-off metal accessories obtained by providing a slot on the first rear cover 421.

Optionally, in another implementation, the first rear cover 421 may be made of a non-conductive material (such as glass or plastic), and the first radiating branch 211 and the second radiating branch 221 are both attached to an inner side of the first rear cover 421.

Figure 6:
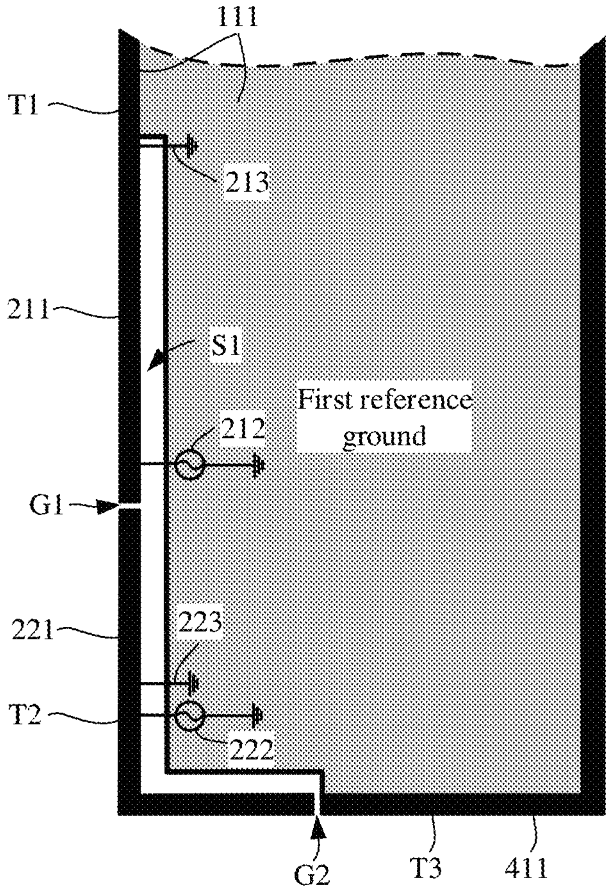
FIG. 6 is a schematic top view of positions at which two same-band antennas included in the antenna system shown in FIG. 5 are disposed on a first body.

Refer to FIG. 4 and FIG. 6. In the first implementation, the first antenna 21 further includes a first feed point 212 and a first grounding point 213 that are coupled to the first radiating branch 211, and the second antenna 22 further includes a second feed point 222 and a second grounding point 223 that are coupled to the second radiating branch 221.

The first middle frame 411 is provided with the first gap G1 and a second gap G2. The first gap G1 and the second gap G2 divide the first middle frame 411 into a first subsection T1, a second subsection T2, and a third subsection T3 that are adjacent to each other successively.

The first subsection T1 is coupled to both the first feed point 212 and the first grounding point 213. A minimum distance from the first feed point 212 to a center of the first gap G1 is less than a minimum distance from the first grounding point 213 to the center of the first gap G1. A metal section between a position at which the first subsection T1 is coupled to the first grounding point 213 and the first gap G1 is the first radiating branch 211.

The second subsection T2 is coupled to both the second feed point 222 and the second grounding point 223. A minimum distance from the second feed point 222 to the center of the first gap G1 is greater than a minimum distance from the second grounding point 223 to the center of the first gap G1. The second subsection T2 is the second radiating branch 221.

The first radiating branch 211 and the second radiating branch 221 are further spaced apart from a first reference ground 111 on the first main body 11 by the first slot S1 separately. The first reference ground 111 is a combination of several metal components on the first body 11, for example, another metal structure included in the first middle frame 411 except the first radiating branch 211 and the second radiating branch 221, a grounding layer of the first circuit board assembly 511, a metal structure included in the first rear cover 421, a metal structure included in the first battery cell 512, and the like. To facilitate illustration in the figure and facilitate understanding, the first reference ground 111 is represented by a complete equivalent block structure with a specific thickness in this application.

In the first implementation, the first feed point 212 may be coupled to a first radio frequency module (not shown) included in the radio frequency module 25 through a connector (not shown). For example, the connector may include an elastic component on the first circuit board assembly 511 and a microstrip line, and the elastic component is coupled to the first radio frequency module through the microstrip line. The first radiating branch 211 is grounded through the first grounding point 213 and coupled to the first radio frequency module through the first feed point 212. The first radiating branch 211 receives an internal electromagnetic wave signal input by the first radio frequency module through the first feed point 212, and radiates the internal electromagnetic wave signal to the outside. The first radiating branch 211 is further configured to receive an external electromagnetic wave signal, transmit the external electromagnetic wave signal to the first radio frequency module through the first feed point 212, and then the processor 31 performs corresponding signal processing on the external electromagnetic wave signal. Therefore, wireless communication between the electronic device 100 and an external device can be implemented through the first antenna 21.

Similarly, the second feed point 222 may be coupled to a second radio frequency module (not shown) included in the radio frequency module 25 through a connector (not shown). The second radiating branch 221 is grounded through the second grounding point 223 and coupled to the second radio frequency module through the second feed point 222. An operating principle of the second antenna 22 is the same as an operating principle of the first antenna 21. The details are not described herein again.

Figure 7:
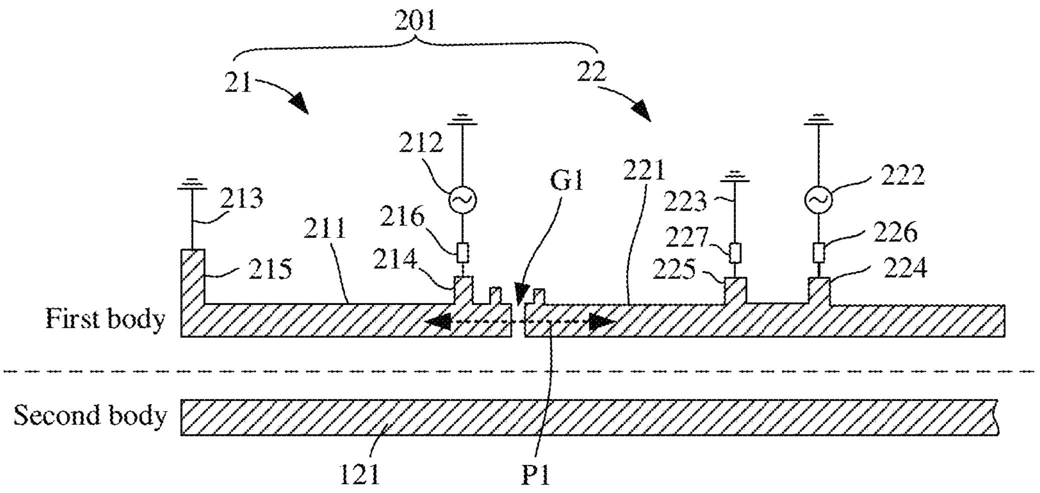
FIG. 7 is a schematic diagram of an equivalent structure of the antenna system shown in FIG. 5.

In a folded state, as shown in FIG. 7, a second reference ground 121 on the second body 12 is close to the first radiating branch 211 and the second radiating branch 221. The second reference ground 121 is a combination of several metal components on the second body 12, for example, a metal structure included in the second middle frame 412, a grounding layer of the second circuit board assembly 521, a metal structure included in the second rear cover 422, a metal structure included in the second battery cell 522, and the like. To facilitate illustration in the figure and facilitate understanding, the second reference ground 121 is represented by a complete equivalent block structure with a specific thickness in this application.

In the first implementation, a first feed branch 214 coupled to the first feed point 212 and a first grounding branch 215 coupled to the first grounding point 213 may also extend from the first radiating branch 211. Similarly, a second feed branch 224 coupled to the second feed point 222 and a second grounding branch 225 coupled to the second grounding point 223 may also extend from the second radiating branch 221.

Optionally, in another implementation, the first feed point 212 and the first grounding point 213 may be directly disposed on the first radiating branch 211, and the second feed point 222 and the second grounding point 223 may be directly disposed on the second radiating branch 221.

The first antenna 21 further includes a first matching circuit 216 coupled to the first feed point 212. The first matching circuit 216 is configured to implement impedance matching of the first antenna 21, to reduce signal energy loss and improve radiation efficiency of the first antenna 21. This enables the first antenna 21 to obtain more ideal antenna performance. The second antenna 22 further includes a second matching circuit 226 coupled to the second feed point 222. The second matching circuit 226 is configured to implement impedance matching of the second antenna 22, to reduce signal energy loss and improve radiation efficiency of the second antenna 22. This enables the second antenna 22 to obtain more ideal antenna performance.

Optionally, the second antenna 22 may further include a third matching circuit 227 coupled to the second grounding point 223. The third matching circuit 227 is configured to implement impedance matching of the second antenna 22 more flexibly, to improve antenna performance of the second antenna 22.

The first matching circuit 216, the second matching circuit 226, and the third matching circuit 227 may all be disposed on the first circuit board assembly 511. Each matching circuit may include one or more of a capacitor, an inductor, a switching element, or the like, and a specific circuit architecture of each matching circuit may be set based on an actual need, which is not specifically limited in this application.

In the first implementation, both the first antenna 21 and the second antenna 22 are configured to provide resonance. Specifically, when the first feed point 212 feeds the first radiating branch 211, a radio frequency electromagnetic field may be generated by exciting the first radiating branch 211, to radiate an electromagnetic wave into space, forming corresponding resonance. Similarly, when the second feed point 222 feeds the second radiating branch 221, a radio frequency electromagnetic field may be generated by exciting the second radiating branch 221, to radiate an electromagnetic wave into space, forming corresponding resonance.

In the first implementation, the first antenna 21 and the second antenna 22 may be antennas at a low band (600 MHz to 960 MHz), such as an LTE B28 (703 MHz to 803 MHz), an LTE B5 (824 MHz to 894 MHz), an LTE B8 (880 MHz to 960 MHz), or the like.

As shown in FIG. 7, because the first gap G1 exists between the first antenna 21 and the second antenna 22, when any antenna is operating, opposite ends of the two antennas form a "capacitor", and a first coupling path P1 passing through the first radiating branch 211, the first gap G1, and the second radiating branch 221 is formed between the first antenna 21 and the second antenna 22. This enables electric field coupling to occur between the first antenna 21 and the second antenna 22 through the first coupling path P1. When the first antenna 21 and the second antenna 22 operate at a same band, an isolation between the first antenna 21 and the second antenna 22 is relatively low when the electronic device 100 is in the unfolded state or in the folded state. This affects operating performance and radiation efficiency of the two same-band antennas.

Figure 8:
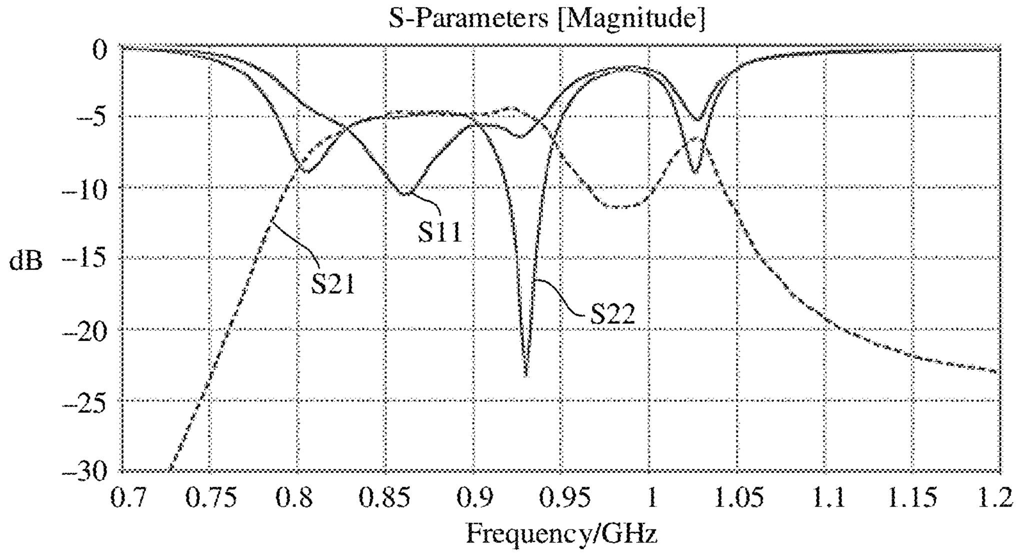
FIG. 8 is a schematic diagram of S-parameter curves of the two same-band antennas included in the antenna system shown in FIG. 7 when the electronic device is in a folded state.

FIG. 8 shows a schematic diagram of S-parameter curves of two same-band antennas included in the antenna system 201 in the first implementation when an electronic device 100 is in a folded state. It may be learned from a curve S21 in FIG. 8 that an isolation between the two same-band antennas of the antenna system 201 in the operating band 0.8 GHZ-0.95 GHz is approximately −5 dB, which is relatively poor.

Figure 9:
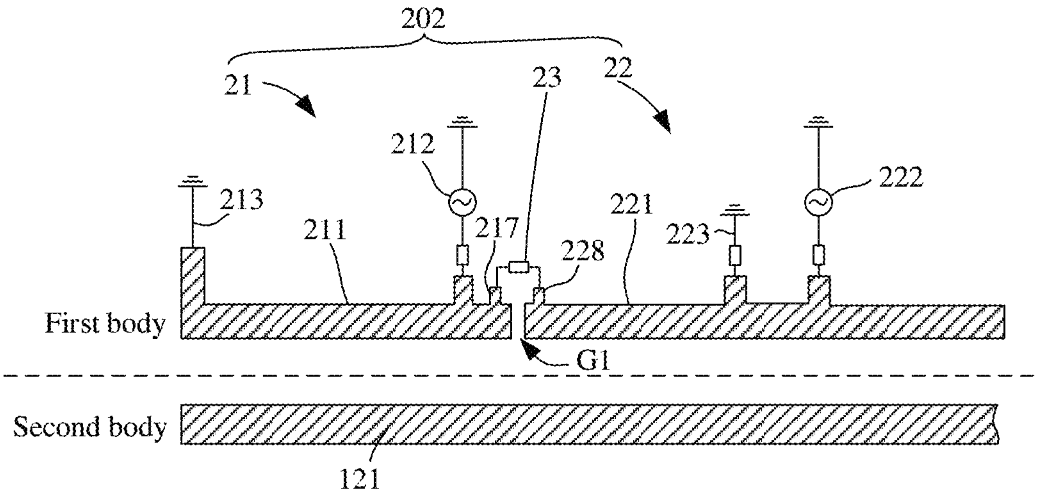
FIG. 9 is a schematic diagram of an equivalent structure of an antenna system according to a second implementation of this application, where the antenna system includes a decoupling structure.

To increase the isolation between the two same-band antennas, namely, the first antenna 21 and the second antenna 22, as shown in FIG. 9, this application further provides an antenna system 202 in a second implementation. A structure of the antenna system 202 provided in the second implementation is similar to a structure of the antenna system 201 shown in FIG. 7. A difference is that the antenna system 202 provided in the second implementation further includes a decoupling structure 23 connected in series between the two same-band antennas. The decoupling structure 23 is configured to cut off the first coupling path P1 that is between the two same-band antennas and that passes through the first gap G1. This enables the first antenna 21 and the second antenna 22 not to be coupled through the first coupling path P1.

Specifically, the first radiating branch 211 further includes a first coupling end 217 adjacent to the first gap G1, and the second radiating branch 221 further includes a second coupling end 228 adjacent to the first gap G1. The decoupling structure 23 is connected in series between the first coupling end 217 of the first radiating branch 211 and the second coupling end 228 of the second radiating branch 221. In this way, the decoupling structure 23 may be configured to cut off the first coupling path P1 between the first antenna 21 and the second antenna 22.

In the second implementation, the decoupling structure 23 is a band-stop filter. The band-stop filter may include an inductance element, or a combination of an inductor and a capacitor.

In an implementation, the decoupling structure 23 may be disposed on the first circuit board assembly 511. In another implementation, the decoupling structure 23 may be disposed in the first gap G1.

For example, the band-stop filter includes the inductance element. When the electronic device 100 is in the unfolded state, the first coupling path P1 between the first antenna 21 and the second antenna 22 may be cut off by adjusting an inductance value of the inductance element. This enables a high isolation to exist between the first antenna 21 and the second antenna 22. A range of the inductance value of the inductance element is 3 nH-300 nH.

Figure 10A:
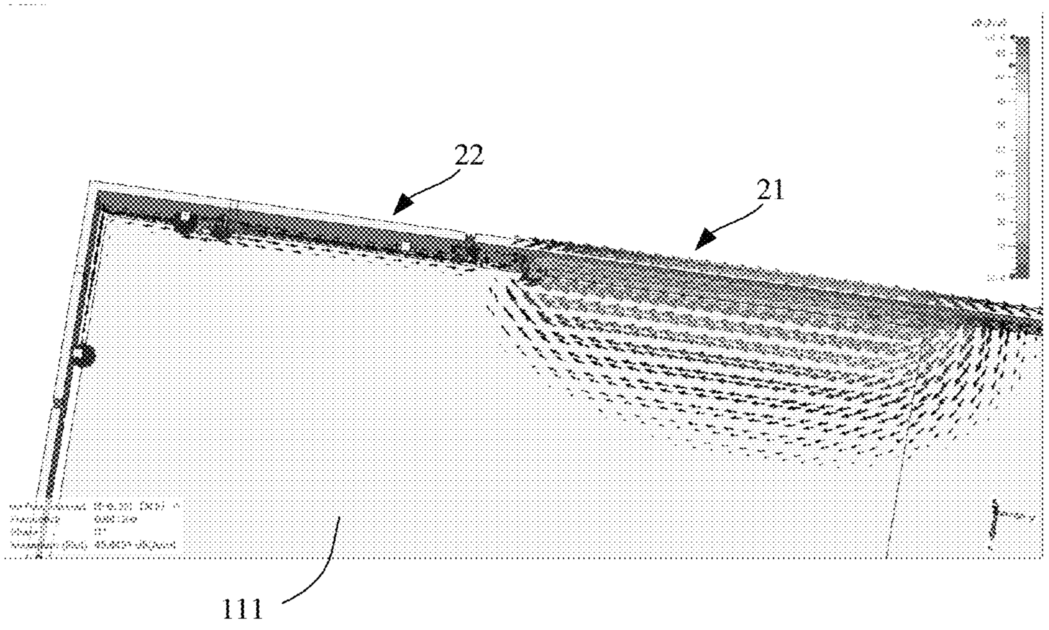
FIG. 10A is a diagram of current distribution simulation of two same-band antennas included in the antenna system shown in FIG. 9 when an electronic device is in an unfolded state and a first antenna is excited.
Figure 10B:
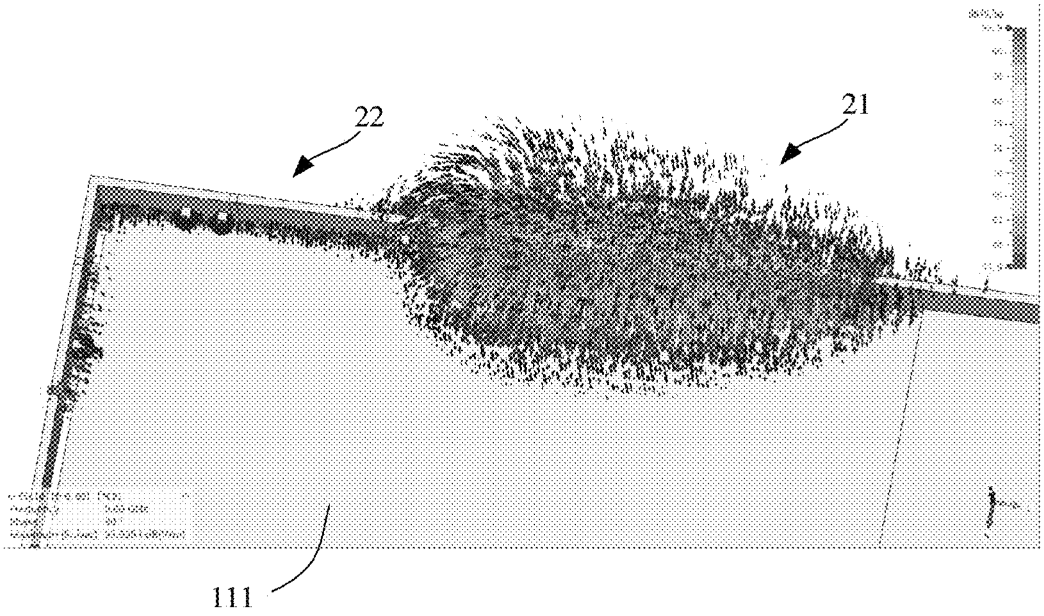
FIG. 10B is a diagram of electric field distribution simulation of two same-band antennas included in the antenna system shown in FIG. 9 when an electronic device is in an unfolded state and a first antenna is excited.

FIG. 10A shows a diagram of current distribution simulation of two same-band antennas included in the antenna system 202 shown in FIG. 9 when the electronic device 100 is in an unfolded state and a first antenna 21 is excited. FIG. 10B shows a diagram of electric field distribution simulation of two same-band antennas included in the antenna system 202 shown in FIG. 9 when the electronic device 100 is in an unfolded state and a first antenna 21 is excited. It may be learned from FIG. 10A and FIG. 10B that, after the decoupling structure 23 is used for the antenna system 202, a current and an electric field excited on the first antenna 21 are basically not coupled to the second antenna 22 when the electronic device 100 is in the unfolded state and the first antenna 21 is excited.

Figure 10C:
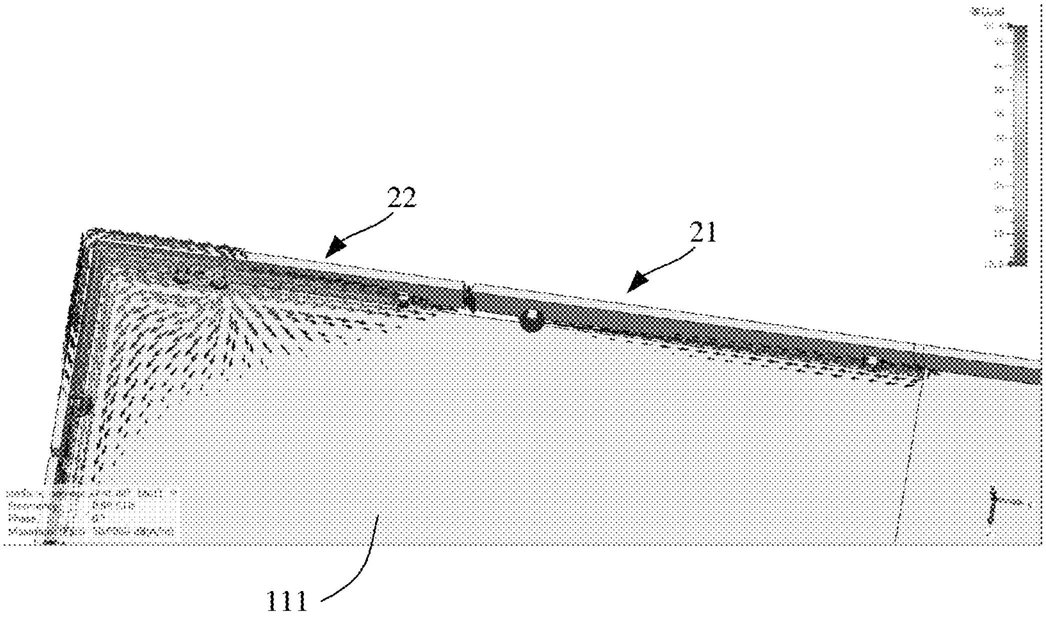
FIG. 10C is a diagram of current distribution simulation of two same-band antennas included in the antenna system shown in FIG. 9 when an electronic device is in an unfolded state and a second antenna is excited.
Figure 10D:
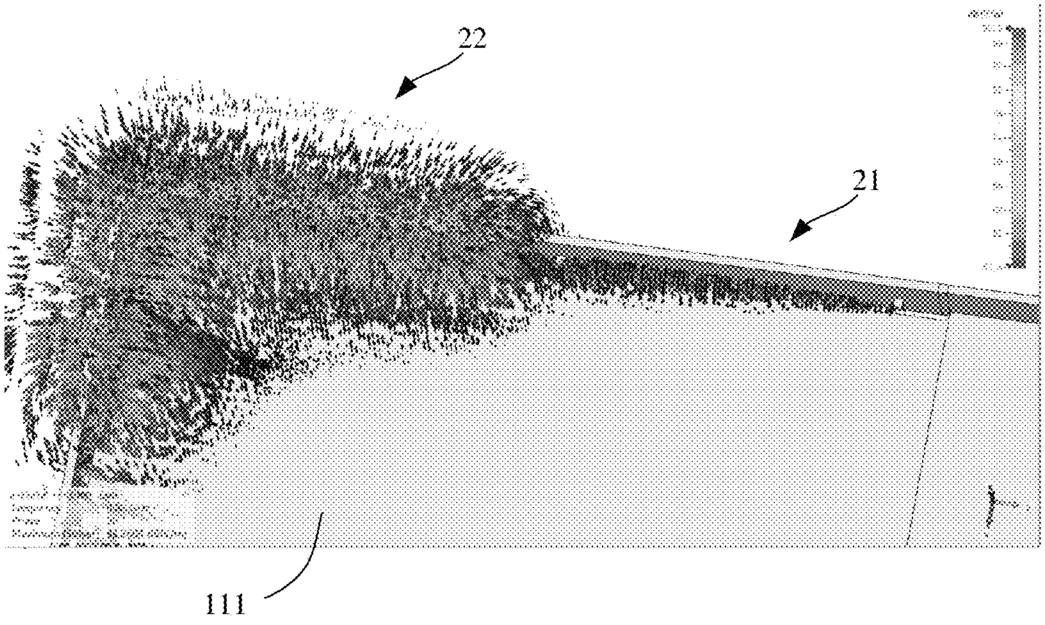
FIG. 10D is a diagram of electric field distribution simulation of two same-band antennas included in the antenna system shown in FIG. 9 when an electronic device is in an unfolded state and a second antenna is excited.

Similarly, FIG. 10C shows a diagram of current distribution simulation of two same-band antennas included in the antenna system 202 shown in FIG. 9 when the electronic device 100 is in the unfolded state and a second antenna 22 is excited. FIG. 10D shows a diagram of electric field distribution simulation of two same-band antennas included in the antenna system 202 shown in FIG. 9 when the electronic device 100 is in the unfolded state and the second antenna 22 is excited. It may be learned from FIG. 10C and FIG. 10D that, after the decoupling structure 23 is used for the antenna system 202, a current and an electric field excited on the second antenna 22 are basically not coupled to the first antenna 21 when the electronic device 100 is in the unfolded state and the second antenna 22 is excited.

Figure 11:
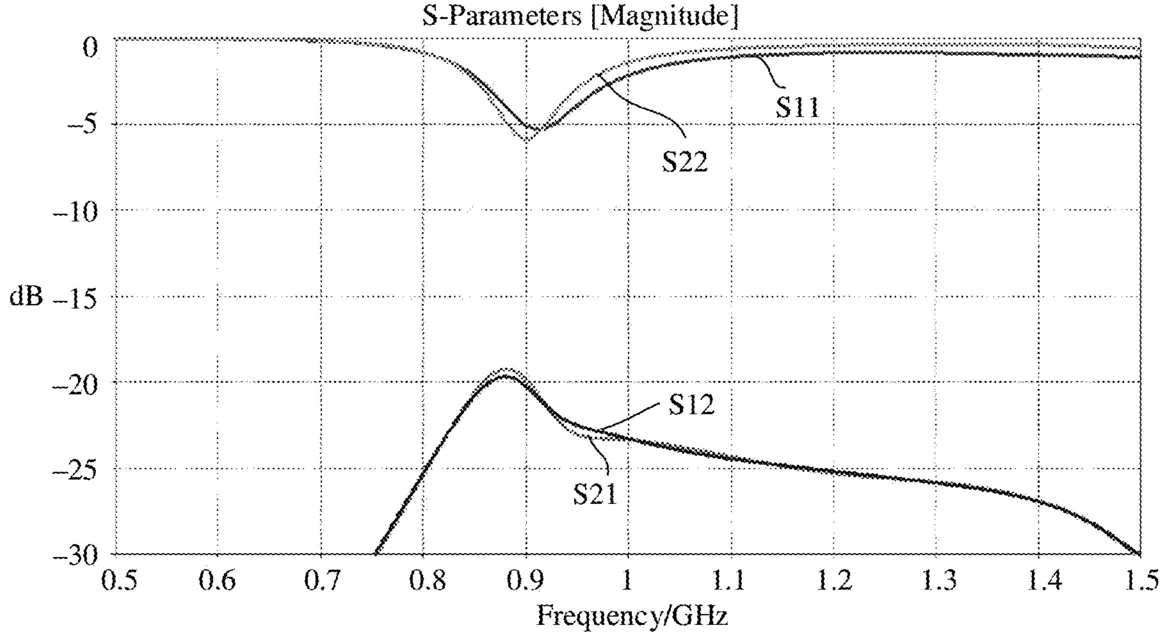
FIG. 11 is a schematic diagram of S-parameter curves of two same-band antennas included in the antenna system shown in FIG. 9 when an electronic device is in an unfolded state.

FIG. 11 is a schematic diagram of S-parameter curves of the two same-band antennas included in the antenna system 202 shown in FIG. 9 when the electronic device 100 is in an unfolded state. It may be learned from a curve S21 in FIG. 11 that, when the electronic device 100 is in the unfolded state, an isolation of the two same-band antennas of the antenna system 202 in an operating band 0.8 GHZ-1 GHz is approximately −20 dB, which is relatively high.

Figure 12A:
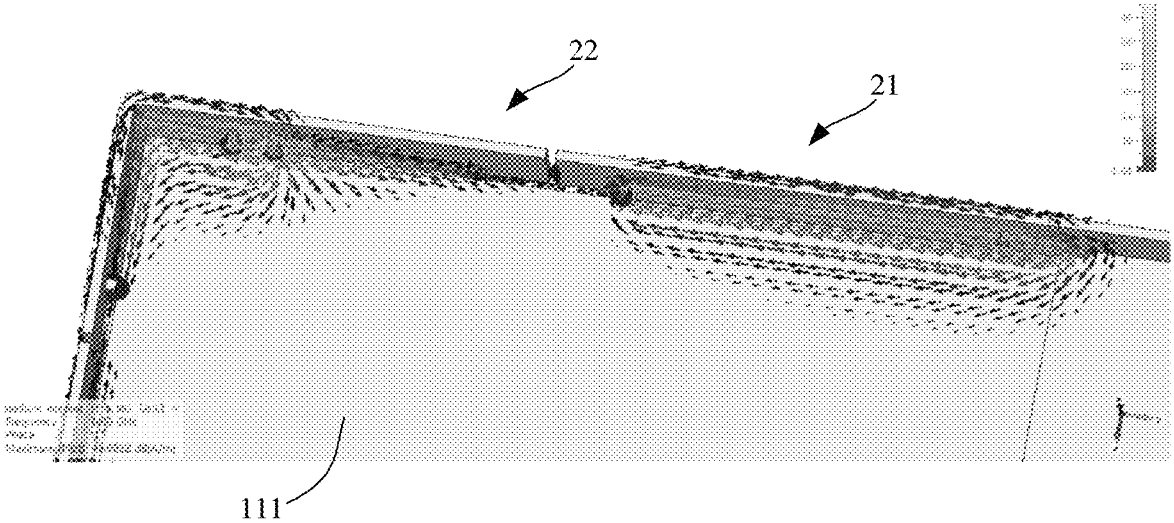
FIG. 12A is a diagram of current distribution simulation of two same-band antennas included in the antenna system shown in FIG. 9 when an electronic device is in a folded state and a second antenna is excited.

FIG. 12A shows a diagram of current distribution simulation of two same-band antennas included in the antenna system 202 shown in FIG. 9 when the electronic device 100 is in a folded state and a second antenna 22 is excited. It may be learned from FIG. 12A that, when the electronic device 100 is in the folded state and the second antenna 22 is excited, although the antenna system 202 includes the decoupling structure 23, a current excited on the second antenna 22 is still coupled to the first antenna 21. Similarly, when the first antenna 21 is excited, a current excited on the first antenna 21 is also coupled to the second antenna 22.

Figure 12B:
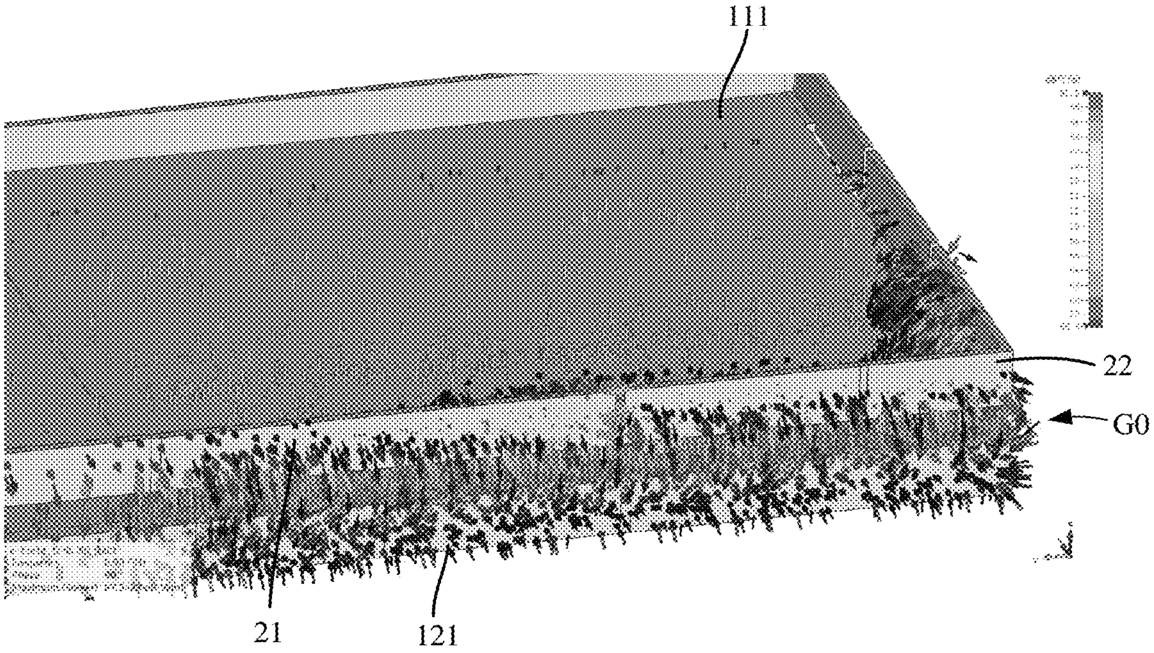
FIG. 12B is a diagram of electric field distribution simulation of two same-band antennas included in the antenna system shown in FIG. 9 when an electronic device is in a folded state and a second antenna is excited.

FIG. 12B shows a diagram of electric field distribution simulation of two same-band antennas included in the antenna system 202 shown in FIG. 9 when the electronic device 100 is in the folded state and the second antenna 22 is excited. It may be learned from FIG. 12B that, when the electronic device 100 is in the folded state and the second antenna 22 is excited, although the antenna system 202 includes the decoupling structure 23, an electric field excited on the second antenna 22 is still coupled to the first antenna 21. Similarly, when the first antenna 21 is excited, an electric field excited on the first antenna 21 is also coupled to the second antenna 22.

Figure 13:
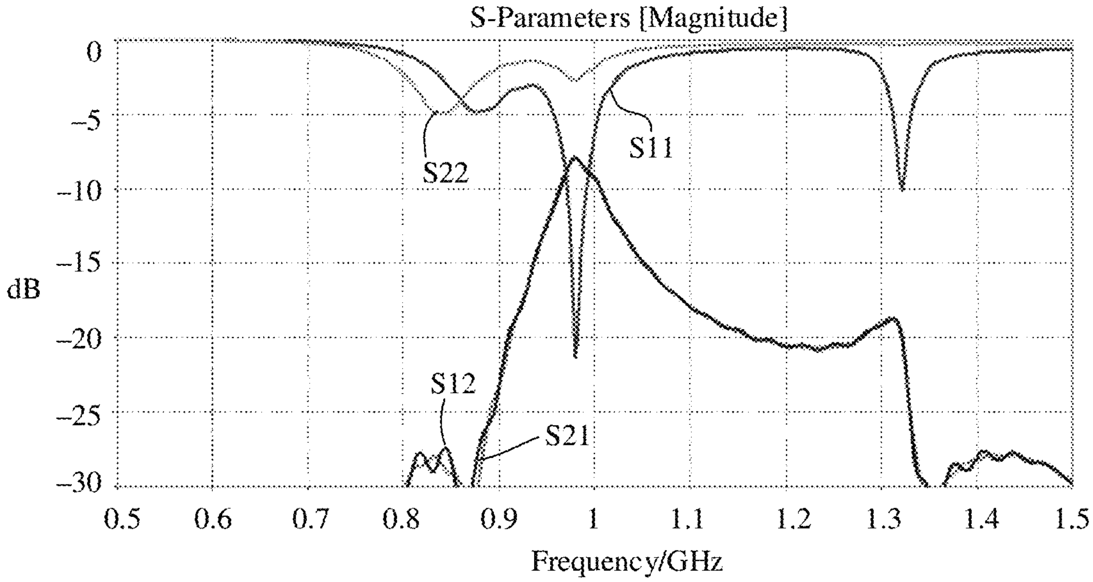
FIG. 13 is a schematic diagram of S-parameter curves of two same-band antennas included in the antenna system shown in FIG. 9 when an electronic device is in a folded state.

FIG. 13 is a schematic diagram of S-parameter curves of two same-band antennas included in the antenna system 202 shown in FIG. 9 when the electronic device 100 is in a folded state. It may be learned from a curve S21 in FIG. 13 that, when the electronic device 100 is in the folded state, an isolation between the two same-band antennas of the antenna system 202 is approximately −12 dB when an operating frequency is approximately 0.96 GHz, which is still poor.

It may be learned that the decoupling structure 23, namely, a band-stop filter including an inductance element, that is connected in series between the first radiating branch 211 and the second radiating branch 221 can cut off only current coupling and electric field coupling between the first antenna 21 and the second antenna 22 in the unfolded state, but cannot cut off current coupling and electric field coupling between the first antenna 21 and the second antenna 22 in the folded state. When the electronic device 100 is in the folded state, current coupling and electric field coupling still occur between the first antenna 21 and the second antenna 22. This results in a low isolation between the first antenna 21 and the second antenna 22, and affects operating performance and radiation efficiency of the two same-band antennas.

Based on simulation results shown in FIG. 12A and FIG. 12B, a principle in which the two same-band antennas included in the antenna system 202 are coupled shown in FIG. 9 is analyzed as follows.

Figure 14A:
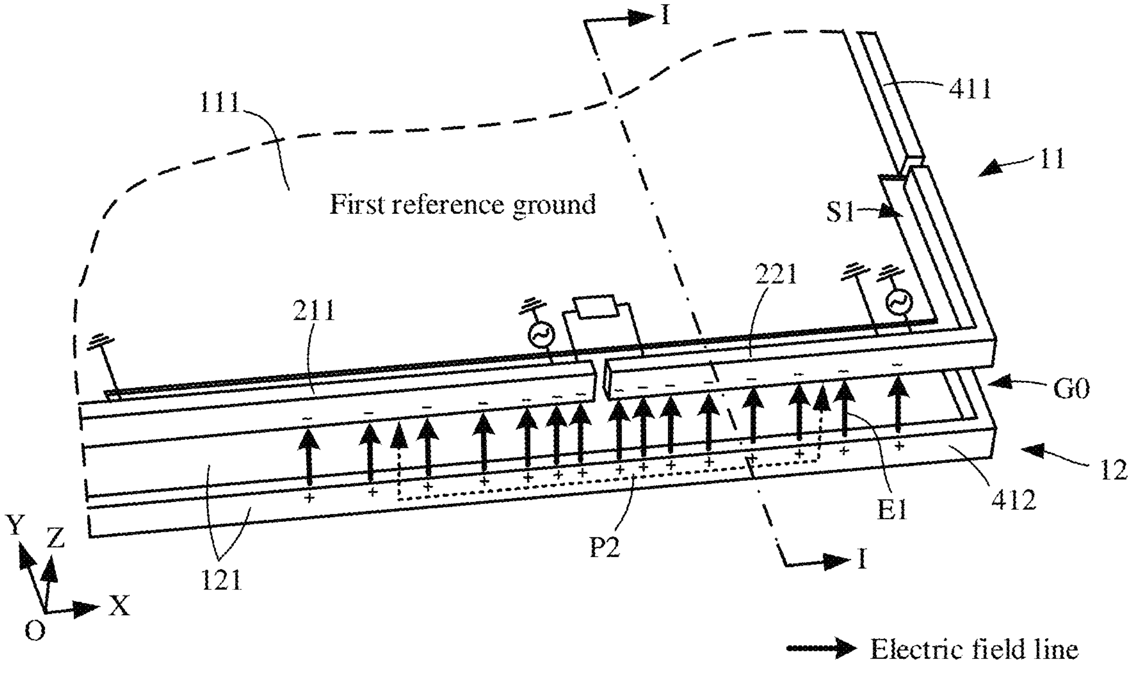
FIG. 14A is a schematic diagram of a principle of electric field distribution between two same-band antennas included in the antenna system shown in FIG. 9 and a second reference ground on a second body when an electronic device is in a folded state and a second antenna is excited.
Figure 14B:
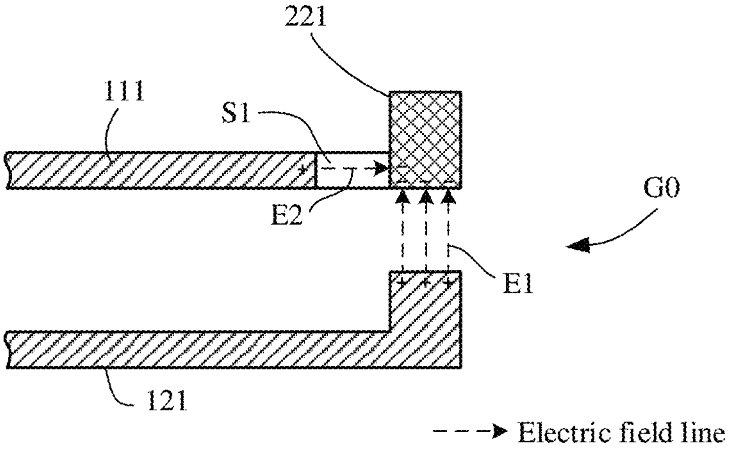
FIG. 14B is a sectional view of a structure shown in FIG. 14A in an I-I direction, and shows an example of a distribution direction of an electric field generated by exciting a second antenna.

Refer to FIG. 14A and FIG. 14B. For example, the second antenna 22 is excited. If the electronic device 100 is in the folded state, and when the second feed point 222 feeds the second radiating branch 221, a current is excited on the second radiating branch 221, and an electric field is excited around the second radiating branch 221.

Because a metal body, namely, the second reference ground 121, on the second body 12, is close to the second radiating branch 221 on the first body 11, the current excited on the second radiating branch 221 induces an electromotive force on the second reference ground 121 near the second radiating branch 221. In this way, as shown in FIG. 14A and FIG. 14B, a first electric field E1 is formed in a middle gap G0 between the second radiating branch 221 and the second reference ground 121. This may be understood as follows. When the electronic device 100 is in the folded state, because the second reference ground 121 is close to the second radiating branch 221 and the middle gap G0 is formed between the second reference ground 121 and the second radiating branch 221, the second radiating branch 221 and the second reference ground 121 form a "capacitor", and the first electric field E1 may be formed between the second radiating branch 221 and the second reference ground 121.

In addition, because the metal body, namely, the first reference ground 111, on the first body 11, is close to the second radiating branch 221, and there is a first slot S1 between the first reference ground 111 and the second radiating branch 221, the current excited on the second radiating branch 221 also induces an electromotive force on the first reference ground 111 near the second radiating branch 221. In this way, as shown in FIG. 14B and FIG. 14C, a second electric field E2 is formed in the first slot S1 between the second radiating branch 221 and the first reference ground 111.

In addition, as shown in FIG. 14A, the first electric field E1 is also coupled to the first radiating branch 211 of the first antenna 21 through the middle gap G0 and the second reference ground 121. Therefore, a current is induced on the first radiating branch 211. Because the first reference ground 111 is close to the first radiating branch 211 and there is the first slot S1 between the first reference ground 111 and the first radiating branch 211, a current induced on the first radiating branch 211 induces an electromotive force on the first reference ground 111 near the radiating branch 211. In this way, as shown in FIG. 14C, a third electric field E3 is formed in the first slot S1 between the first radiating branch 211 and the first reference ground 111.

Figure 14C:
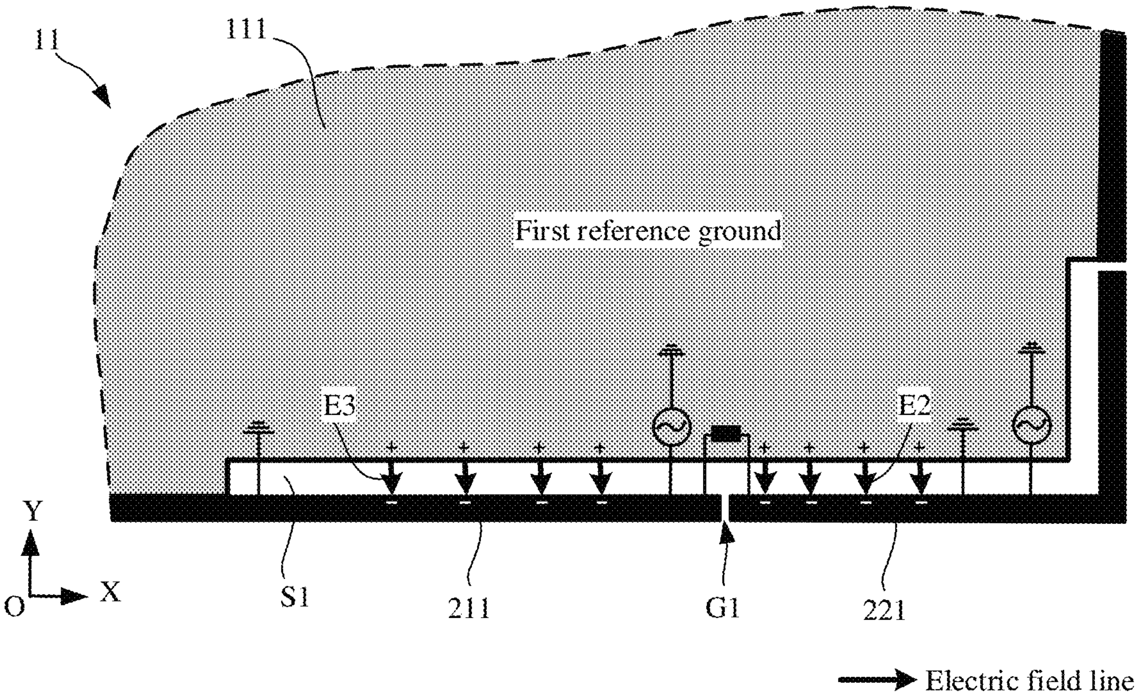
FIG. 14C is a schematic diagram of a principle of electric field distribution between two same-band antennas included in the antenna system shown in FIG. 9 and a first reference ground on a first body when an electronic device is in a folded state and a second antenna is excited.

Refer to FIG. 14A to FIG. 14C. At a first time point t1, if a surface of the second radiating branch 221 is negatively charged, the negatively charged second radiating branch 221 induces positive charges on both the second reference ground 121 and the first reference ground 111 that are near the second radiating branch 221. In this case, a direction (a direction shown in FIG. 14A and FIG. 14B) of the first electric field E1 formed in the middle gap G0 is from the second reference ground 121 to the second radiating branch 221, and a direction (a direction shown in FIG. 14B and FIG. 14C) of the second electric field E2 formed in the first slot S1 is from the first reference ground 111 to the second radiating branch 221. In addition, the positively charged second reference ground 121 induces negative charges on the first radiating branch 211. In this case, a direction (a direction shown in FIG. 14C) of the third electric field E3 formed in the first slot S1 is from the first reference ground 111 to the first radiating branch 211.

It may be understood that, at a second time point t2, if a surface of the second radiating branch 221 is positively charged, a direction of the first electric field E1, a direction of the second electric field E2, and a direction of the third electric field E3 are respectively opposite to the direction of the first electric field E1, the direction of the second electric field E2, and the direction of the third electric field E3 at the first time point t1. To be specific, the direction of the first electric field E1 formed in the middle gap G0 is from the second radiating branch 221 to the second reference ground 121, the direction of the second electric field E2 formed in the first slot S1 is from the second radiating branch 221 to the first reference ground 111, and the direction of the third electric field E3 in the first slot S1 is from the first radiating branch 211 to the first reference ground 111.

A person skilled in the art may understand that a principle in which an electric field is formed by exciting the first antenna 21 is the same as a principle in which an electric field is formed by exciting the second antenna 22. For technical details, refer to the foregoing specific related description of exciting the second antenna 22. The details are not described herein again.

Based on the foregoing analysis and the schematic diagrams shown in FIG. 14A to FIG. 14C, it may be learned that, when the electronic device 100 is in the folded state, although the antenna system 202 includes the decoupling structure 23, an electric field generated by exciting one of the antennas is coupled to the other antenna through the second reference ground 121 on the second body 12. Therefore, electric field coupling occurs between the first antenna 21 and the second antenna 22 through the second reference ground 121. To be specific, the second reference ground 121 on the second body 12 provides one second coupling path P2 (as shown in FIG. 14A) for the first body 11 and the second body 12, and the second coupling path P2 passes through the first radiating branch 211, the middle gap G0, the second reference ground 121, and the second radiating branch 221. In this way, electric field coupling may occur between the first antenna 21 and the second antenna 22 through the second coupling path P2. This causes a low isolation to exist between the first antenna 21 and the second antenna 22 when the electronic device 100 is in the folded state, affecting operating performance and radiation efficiency of the two same-band antennas.

Figure 14D:
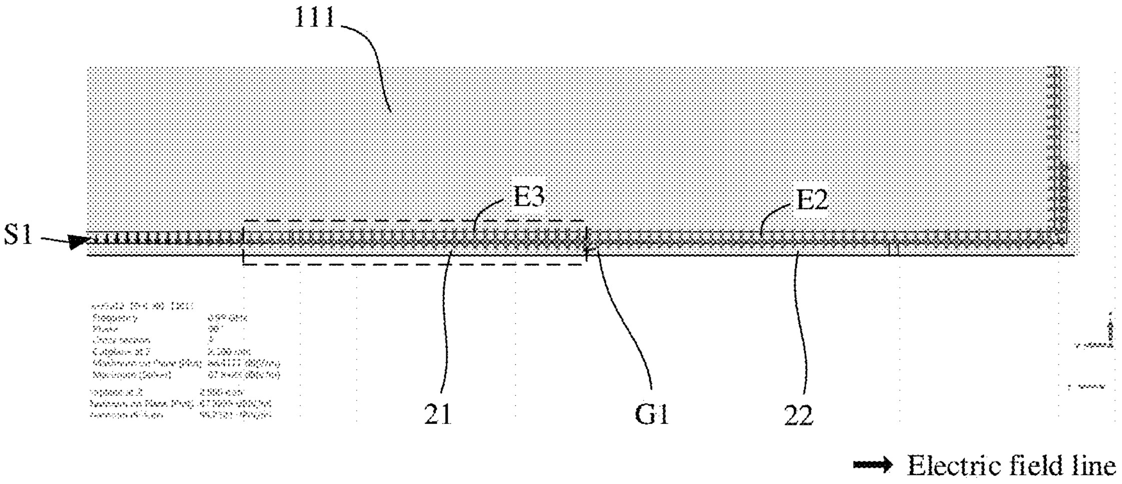
FIG. 14D is a diagram of simulation of electric field distribution formed in a first slot between two same-band antennas included in the antenna system shown in FIG. 9 and a first reference ground on a first body when an electronic device is in a folded state and a second antenna is excited.

FIG. 14D shows a diagram of simulation of electric field distribution formed in a first slot S1 between two same-band antennas included in the antenna system 202 shown in FIG. 9 and a first reference ground 111 on a first body 11 when the electronic device 100 is in a folded state and a second antenna 22 is excited. It may be learned from FIG. 14D that a large amount of energy of an electric field generated by the second antenna 22 is coupled to the first antenna 21. In addition, as shown in FIG. 14C and FIG. 14D, at a same time point, the direction of the second electric field E2 is the same as the direction of the third electric field E3. In other words, in the first slot S1, the second electric field E2 generated by exciting the second antenna 22 and the third electric field E3 generated by inducing the first antenna 21 are electric fields in a same direction.

To resolve a problem of a low isolation between the first antenna 21 and the second antenna 22, namely, the two same-band antennas, when the foldable electronic device 100 is in the folded state, this application further provides an antenna system 203 in a third implementation.

Figure 15:
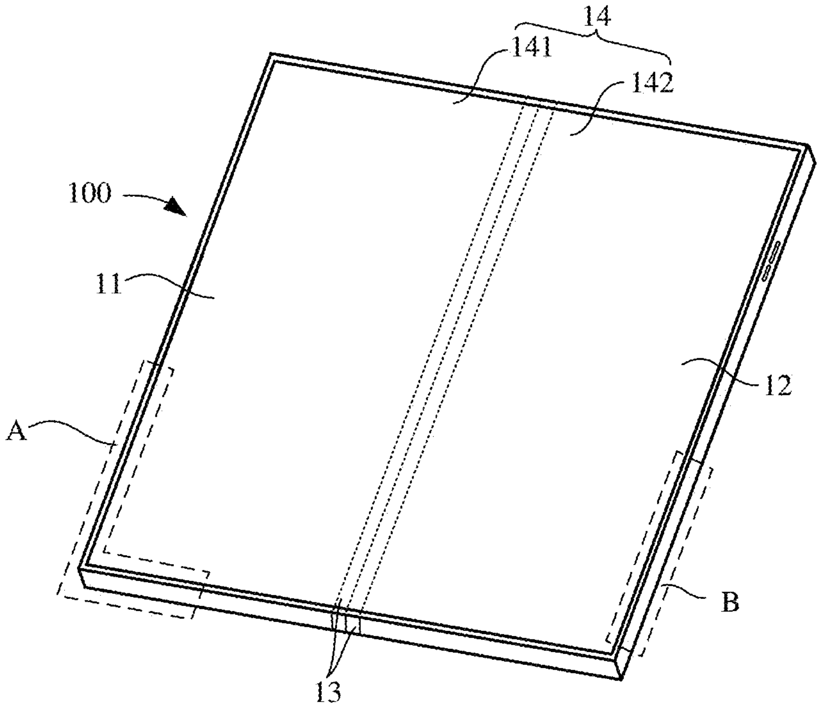
FIG. 15 is a schematic diagram of a position at which an antenna system is disposed on an electronic device in a folded state according to a third implementation of this application.
Figure 16:
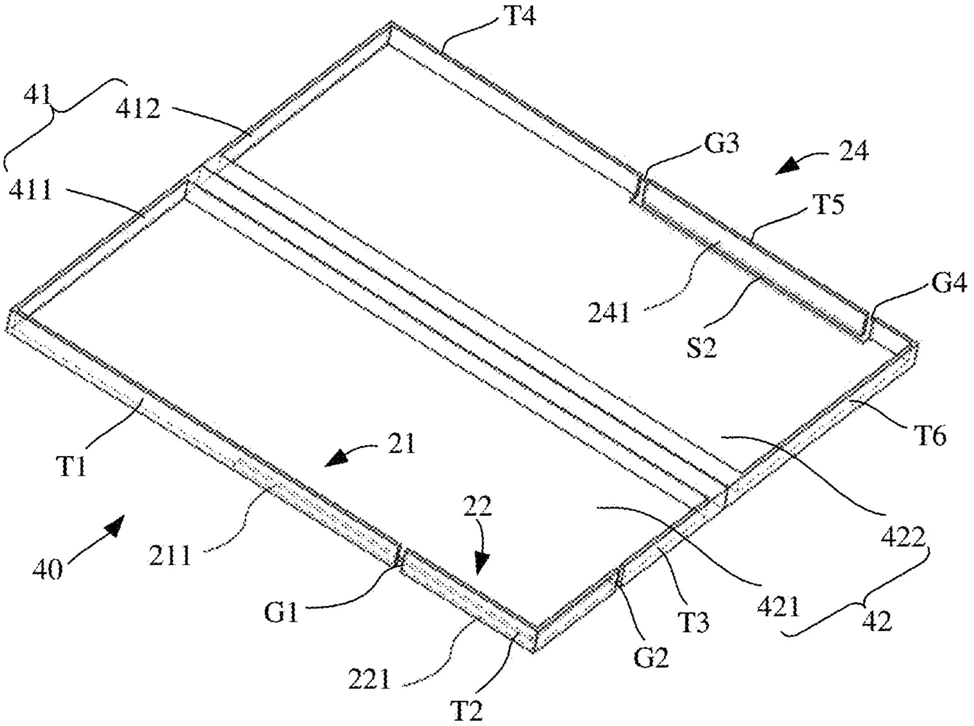
FIG. 16 is a schematic diagram of a position at which an antenna system is disposed on a housing of an electronic device in an unfolded state according to a third implementation of this application, where the antenna system includes a parasitic structure.
Figure 17:
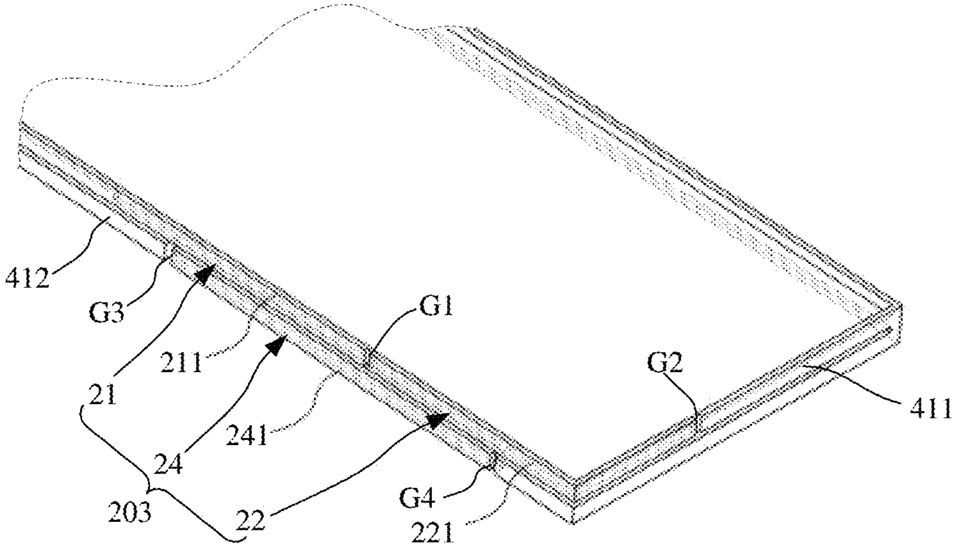
FIG. 17 is a schematic diagram of a position at which the antenna system shown in FIG. 16 is disposed on a housing of an electronic device in a folded state.

FIG. 15 shows a schematic diagram of a position at which the antenna system 203 is disposed on the electronic device 100 in a folded state. FIG. 16 and FIG. 17 show schematic diagrams of a position at which the antenna system 203 is disposed on a housing 40 of the electronic device 100 according to a third implementation. As shown in FIG. 16 and FIG. 17, a structure of the antenna system 203 in the third implementation is similar to the structure of the antenna system 202 in the second implementation. A difference is that the antenna system 203 in the third implementation further includes a parasitic structure 24 disposed on the other body of the electronic device 100, and the parasitic structure 24 at least partially overlaps both the two same-band antennas when the electronic device 100 is in the folded state.

In the third implementation, the parasitic structure 24, when excited, is an antenna structure capable of forming an electric field between one side of a middle of the parasitic branch 241 and the second reference ground and an electric field in an opposite direction, between the other side of the middle of the parasitic branch 241 and the second reference ground.

Specifically, the parasitic structure 24 is a ½ wavelength antenna structure and operates in a half-wavelength mode. The wavelength is an operating wavelength of the two same-band antennas. When the electronic device 100 is in the folded state and any one of the two same-band antennas is operating/excited, the parasitic structure 24 is configured to be coupled to the operating antenna, to form resonance in the half-wavelength mode. A direction of an induced electric field formed between one side of a middle of the parasitic structure 24 and the second reference ground 121 near the parasitic structure 24 is opposite to a direction of an induced electric field between the other side of the middle of the parasitic structure 24 and the second reference ground 121 near the parasitic structure 24. The induced electric field is used to offset an electric field coupled from an operating antenna to the other of the two same-band antennas, to suppress radiated energy on any one of the two same-band antennas from being coupled to the other antenna through the second reference ground 121 on the second body, and further increase an isolation between the first antenna 21 and the second antenna 22.

Specifically, in the third implementation, as shown in FIG. 15, the first antenna 21 and the second antenna 22 are disposed on one body of the electronic device 100. For example, in a first edge region A of the first body 11, and the parasitic structure 24 is disposed on the other body of the electronic device 100, such as in a second edge region B of the second body 12. The first edge region A and the second edge region B may be parts on a middle frame 41 or parts, close to the middle frame 41, of a rear cover 42. The first edge region A overlaps the second edge region B when the electronic device 100 is in the folded state.

In an implementation, the first antenna 21 and the second antenna 22 may be disposed on the first middle frame 411. Correspondingly, the parasitic structure 24 may be disposed on the second middle frame 412. In another implementation, the first antenna 21 and the second antenna 22 may be disposed, near the first middle frame 411, on a first rear cover 421. Correspondingly, the parasitic structure 24 may be disposed at a position, close to the second middle frame 412, on a second rear cover 422. As shown in FIG. 16 and FIG. 17, in this application, for example, the two same-band antennas are separately disposed on the first middle frame 411 of the first body 11, and the parasitic structure 24 is disposed on the second middle frame 412 of the second body 12, to describe a structure of the antenna system 203.

The parasitic structure 24 includes a parasitic branch 241. When the electronic device 100 is in a fully folded state, the parasitic branch 241 at least partially overlaps the first radiating branch 211 and the second radiating branch 221.

In the third implementation, the first middle frame 411 and the second middle frame 412 may be partially or entirely made of a metal material, and the first radiating branch 211 and the second radiating branch 221 are parts of a structure of the first middle frame 411. Correspondingly, the parasitic branch 241 is a part of a structure of the second middle frame 412, and the parasitic branch 241 at least partially overlaps the first radiating branch 211 and the second radiating branch 221 when the electronic device 100 is in a fully folded state.

Optionally, in another implementation, the first middle frame 411 and the second middle frame 412 may be partially or entirely made of a non-conductive material (such as glass or plastic), and the first radiating branch 211 and the second radiating branch 221 are both attached to an inner inside of the first middle frame 411. Correspondingly, the parasitic branch 241 is attached to an inner side of the second middle frame 412.

Optionally, in another implementation, the first rear cover 421 and the second rear cover 422 may be made of a metal material, and the first radiating branch 211 and the second radiating branch 221 are parts of a structure of the first rear cover 421. Correspondingly, the parasitic branch 241 is a part of a structure of the second rear cover 422. For example, the first radiating branch 211 and the second radiating branch 221 may be cut-off metal accessories obtained by providing a slot on the first rear cover 421, and the parasitic branch 241 may be a cut-off metal accessory obtained by providing a slot on the second rear cover 422.

Optionally, in another implementation, the first rear cover 421 and the second rear cover 422 may be made of a non-conductive material (such as glass or plastic), and the first radiating branch 211 and the second radiating branch 221 are both attached to an inner side of the first rear cover 421. Correspondingly, the parasitic branch 241 is attached to an inner side of the second rear cover 422.

In the third implementation, as shown in FIG. 17, when the electronic device 100 is in the fully folded state, a middle of the parasitic branch 241 is opposite to the first gap G1. In addition, a distance from a projection of a center of the first gap G1 on the parasitic branch 241 to the middle of the parasitic branch 241 is less than or equal to one-eighth of a wavelength corresponding to a resonant frequency of the parasitic structure 24, that is, one-eighth of an operating wavelength of the two same-band antennas.

When any one of the first antenna 21 and the second antenna 22 is operating, the parasitic branch 241 of the parasitic structure 24 is configured to be coupled to a radiating branch of the operating antenna, to form resonance in a half-wavelength mode (also referred to as a ½ wavelength mode or a ½λ mode). In this way, two electric fields in opposite directions may be generated on both sides of the middle of the parasitic branch 241. To be specific, a principle in which the antenna system 203 uses the resonance in the half-wavelength mode to generate the electric fields in opposite directions at both ends of the parasitic branch 241, to offset an induced electric field coupled from one of the two same-band antennas to the other antenna.

In a form of implementing the third implementation, as shown in FIG. 16 to FIG. 19, the parasitic structure 24 is a linear antenna, and the linear antenna operates in the half-wavelength mode.

Specifically, as shown in FIG. 16, the second middle frame 412 is provided with a third gap G3 and a fourth gap G4. The third gap G3 and the fourth gap G4 divide the second middle frame 412 into a fourth subsection T4, a fifth subsection T5, and a sixth subsection T6 that are successively connected to each other. The fifth subsection T5 is the parasitic branch 241 of the linear antenna 24.

Figure 18:
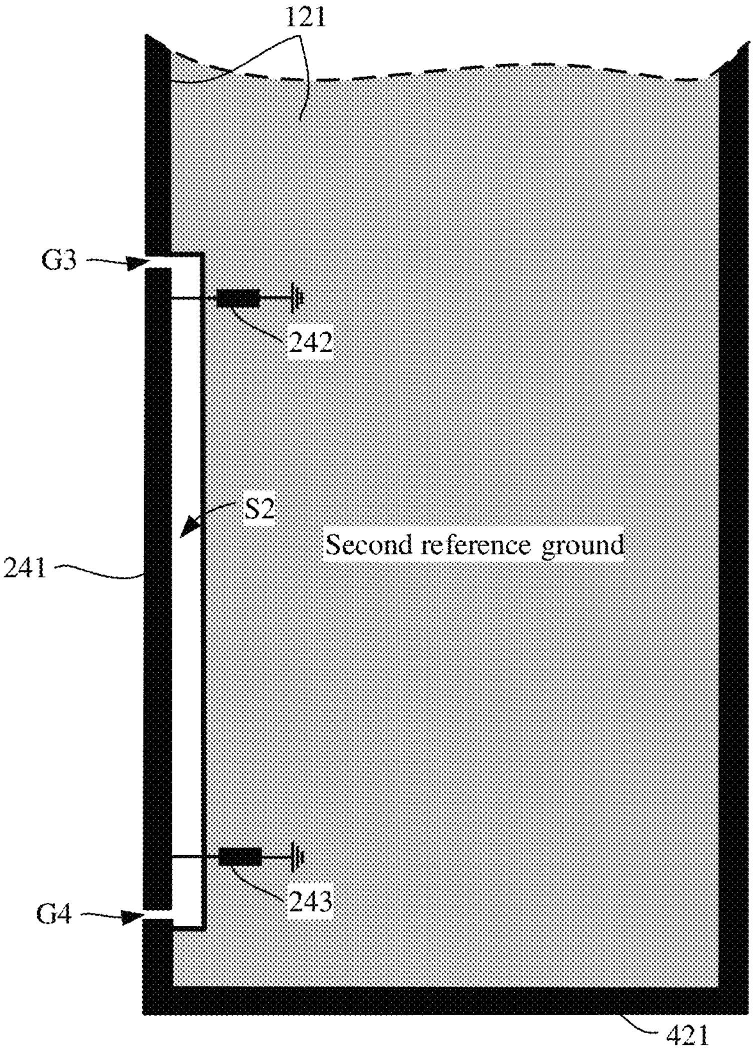
FIG. 18 is a schematic top view of a position at which the parasitic structure included in the antenna system shown in FIG. 16 is disposed on a second body.

Refer to FIG. 16 and FIG. 18. The parasitic branch 241 is spaced apart from the second reference ground 121 on the second body 12 by a second slot S2. When the electronic device 100 is in the folded state, the first slot S1 is opposite to the second slot S2.

Refer to FIG. 19. The parasitic branch 241 is a strip conductor, including a first radiator L1 and a second radiator L2 located on both sides of a middle of the parasitic branch 241. The first radiator L1 and the second radiator L2 are an integral structure. When the electronic device 100 is in the folded state, the first radiator L1 overlaps the first radiating branch 211, and the second radiator L2 overlaps the second radiating branch 221.

Refer to FIG. 18 and FIG. 19. The linear antenna 24 further includes a fourth matching circuit 242 and a fifth matching circuit 243 that are respectively coupled to both ends of the parasitic branch 241. The fourth matching circuit 242 and the fifth matching circuit 243 are configured to adjust a resonant frequency of the parasitic structure 24. This enables an induced electric field generated by coupling the parasitic structure 24 and the two same-band antennas to be efficiently offset by induced electric fields that are in a same direction generated by the two same-band antennas, to achieve a purpose of suppressing coupling radiated energy on one of the two same-band antennas to the other antenna.

The fourth matching circuit 242 and the fifth matching circuit 243 may be both disposed on the second circuit board assembly 521, and may each include one or more of a capacitor, an inductor, a switching element, and the like. A specific circuit architecture of the fourth matching circuit 242 or the fifth matching circuit 243 may be set based on an actual requirement, which is not specifically limited in this application.

In the third implementation, a length of the parasitic branch 241 is half of a wavelength corresponding to the resonant frequency of the parasitic structure 24, that is, half of an operating wavelength of the two same-band antennas. In actual application, the length of the parasitic branch 241 may be adjusted by adjusting positions of the third gap G3 and the fourth gap G4. Conversely, a frequency range of resonance in the half-wavelength mode may be adjusted by adjusting the length of the parasitic branch 241.

Figure 20:
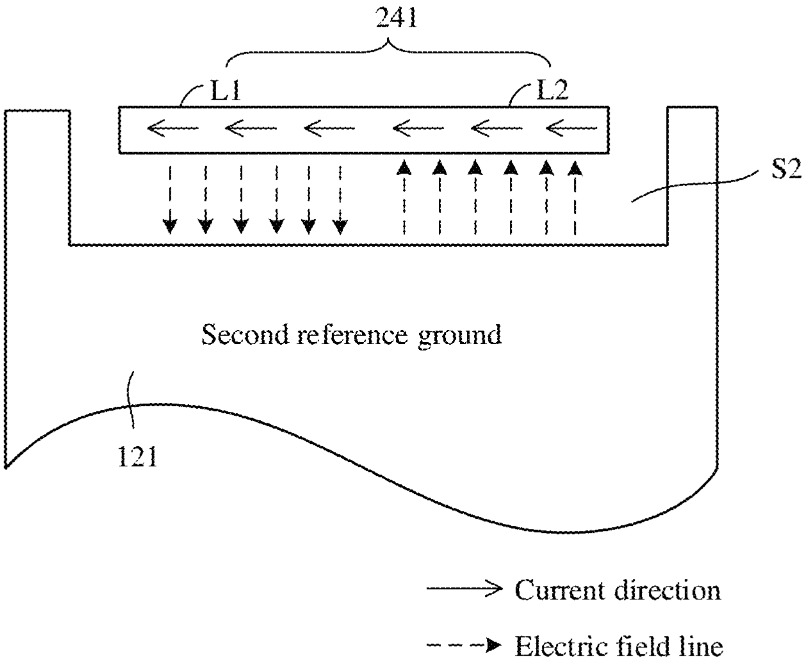
FIG. 20 is a schematic diagram of a principle of current distribution and electric field distribution generated when a parasitic structure shown in FIG. 19 is excited.

When the linear antenna 24 is used as an active antenna, an operating mode of the antenna is the same as or similar to a differential mode (differential mode, DM) linear antenna mode of a linear antenna described in Chinese Patent Application No. CN112751159A. For a specific operating principle, refer to detailed description of a DM linear antenna mode of the linear antenna in Chinese Patent Application No. CN112751159A. Details are not described herein. In this application, the linear antenna 24 is used as a passive parasitic structure, and performs magnetic field coupled feeding with an excited antenna of the two same-band antennas. An operating principle of the linear antenna 24 when used as a passive parasitic structure is similar to an operating principle of the linear antenna 24 when used as an active antenna. Refer to FIG. 20. When the linear antenna 24 performs coupled feeding with any one of the two same-band antennas to form resonance in a half-wavelength mode, directions of induced currents respectively generated on the first radiator L1 and the second radiator L2 of the parasitic branch 241 are the same. Induced electric fields generated in the second slot S2 between the parasitic branch 241 and the second reference ground 121 are distributed in opposite directions on both sides of the middle of the parasitic branch 241. To be specific, a direction of an induced electric field generated in the second slot S2 between the first radiator L1 and the second reference ground 121 is opposite to a direction of an induced electric field generated in the second slot S2 between the second radiator L2 and the second reference ground 121.

An operating principle of the antenna system 203 is described below.

Figure 21A:
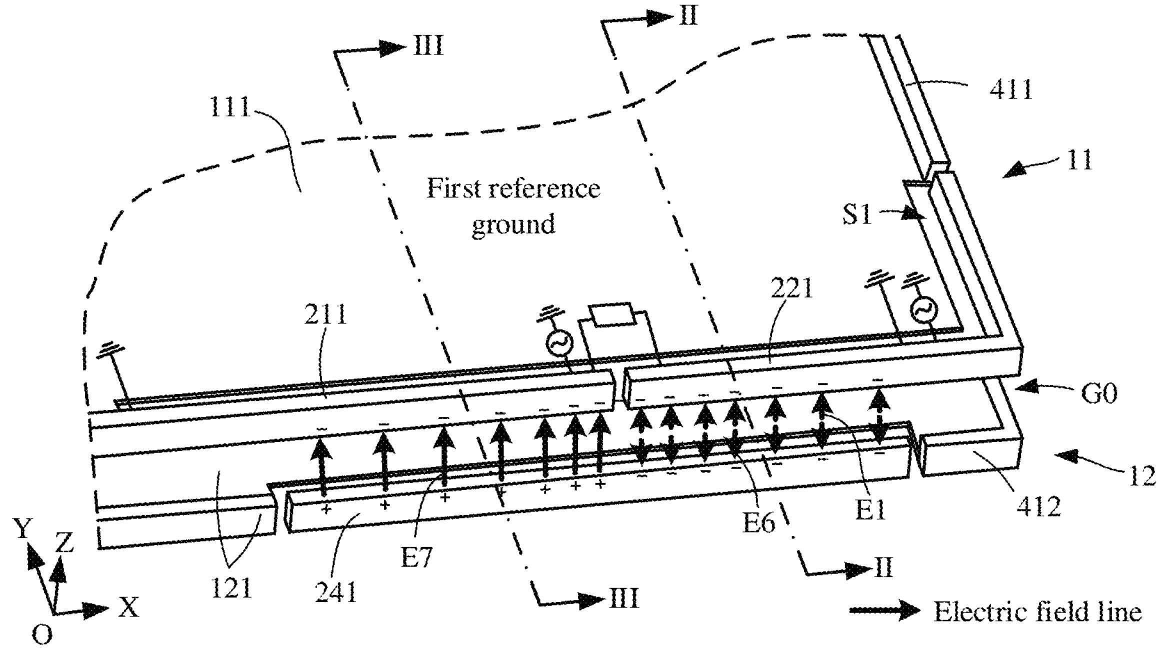
FIG. 21A is a schematic diagram of a principle of electric field distribution between two same-band antennas included in the antenna system shown in FIG. 19 and a parasitic structure when an electronic device is in a folded state and a second antenna is excited.
Figure 21B:
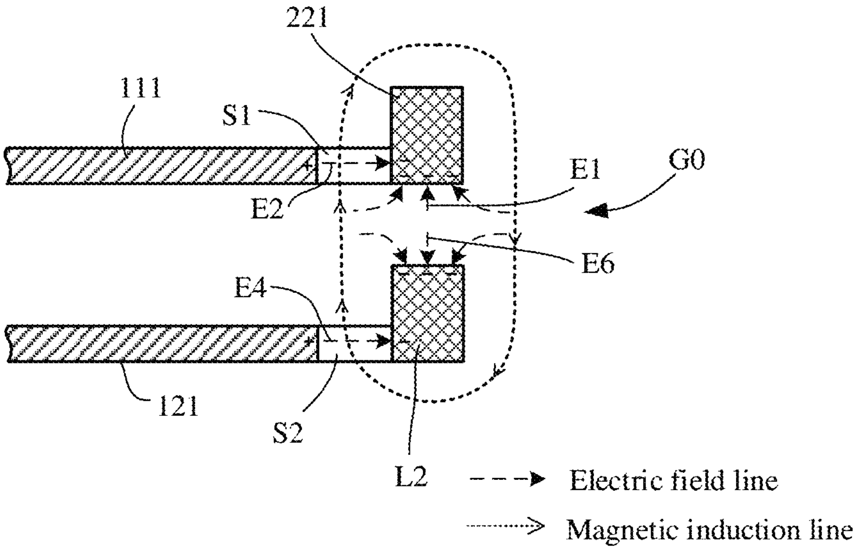
FIG. 21B is a sectional view of a part of a structure shown in FIG. 21A in an II-II direction, and shows an example of a distribution direction of an electric field generated by exciting the second antenna, and a distribution direction of an electric field generated by inducing the parasitic structure.
Figure 21C:
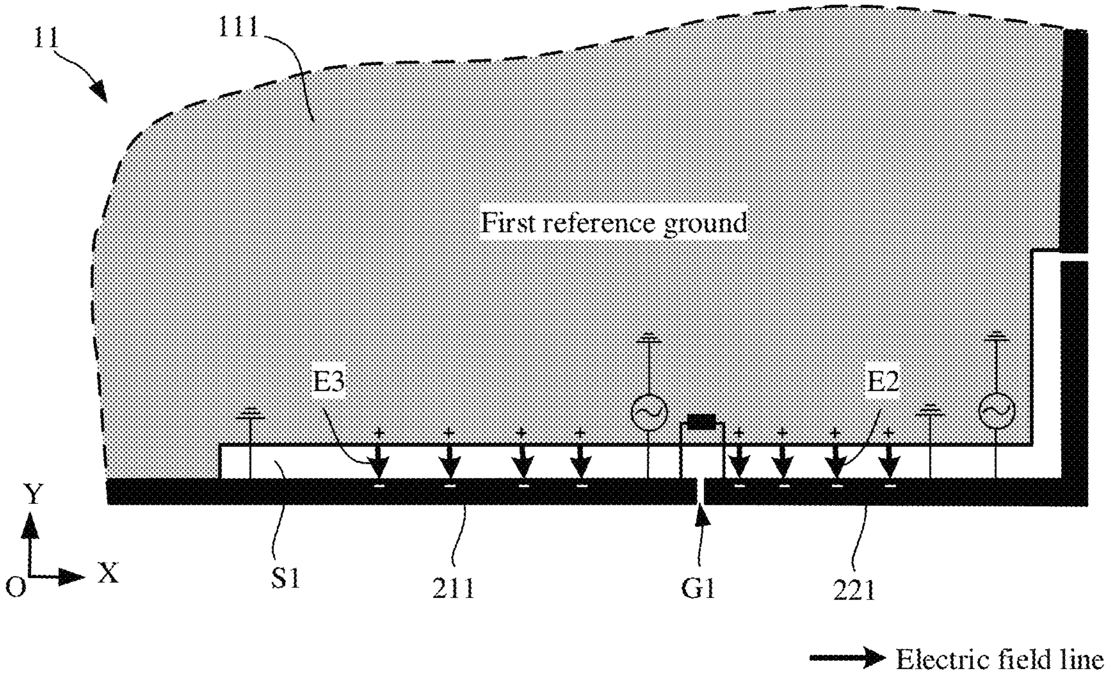
FIG. 21C is a schematic diagram of a principle of electric field distribution between two same-band antennas included in the antenna system shown in FIG. 19 and a first reference ground on a first body when an electronic device is in a folded state and a second antenna is excited.

For example, the second antenna 22 is excited. If the electronic device 100 is in the folded state, when the second feed point 222 of the second antenna 22 feeds the second radiating branch 221, based on the foregoing description, a current is excited on the second radiating branch 221, and an electric field is excited around the second radiating branch 221. As shown in FIG. 21A to FIG. 21C, at a first time point t1, if a surface of the second radiating branch 221 is negatively charged, the negatively charged second radiating branch 221 induces positive charges on the first reference ground 111 near the second radiating branch 221. In this case, a direction of a second electric field E2 generated by exciting the second radiating branch 221 in the first slot S1 is from the first reference ground 111 to the second radiating branch 221 (as shown in a direction shown in FIG. 21B and FIG. 21C).

Because the second radiator L2 of the parasitic branch 241 is close to the second radiating branch 221, magnetic induction lines of a magnetic field excited around the second radiating branch 221 surround the second radiating branch 221 and the second radiator L2. Because the second radiating branch 221 and the second radiator L2 share a same magnetic field, based on the Lenz's law, a direction of an induced current generated on the second radiator L2 is the same as a direction of an induced current generated on the second radiating branch 221. In other words, through magnetic field coupling between the second radiating branch 221 and the second radiator L2, currents in a same direction are induced on the second radiator L2.

Because the second reference ground 121 is close to the second radiator L2 and there is the second slot S2 between the second reference ground 121 and the second radiator L2, an induced current on the second radiator L2 induces an electromotive force on the second reference ground 121 near the second radiator L2. In this way, a fourth electric field E4 is formed in the second slot S2 between the second radiator L2 and the second reference ground 121.

At a same time point, for example, at the foregoing first time point t1, if the surface of the second radiating branch 221 is negatively charged, correspondingly, a surface of the second radiator L2 is also negatively charged, and the negatively charged second radiator L2 induces positive charges on the second reference ground 121 near the second radiator L2. In this case, a direction of the fourth electric field E4 formed in the second slot S2 is from the second reference ground 121 to the second radiator L2 (as shown in a direction shown in FIG. 21B and FIG. 21D).

Figure 21D:
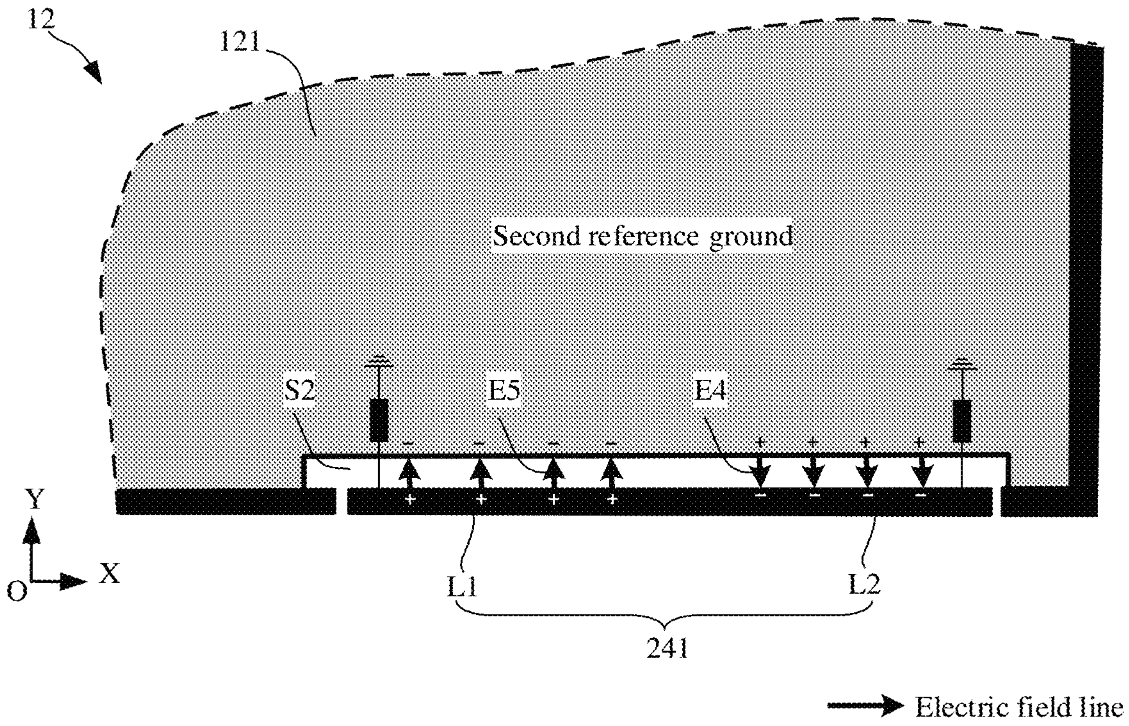
FIG. 21D is a schematic diagram of a principle of electric field distribution between a parasitic structure included in the antenna system shown in FIG. 19 and a second reference ground on a second body when an electronic device is in a folded state and a second antenna is excited.

Because the linear antenna 24 is excited by the second antenna 22 through magnetic field coupling, based on principles of current distribution and electric field distribution generated when the linear antenna 24 shown in FIG. 20 is excited, directions of induced currents respectively generated on the first radiator L1 and the second radiator L3 are the same, and a direction of an induced electric field formed between the first radiator L1 and the second reference ground 121 and a direction of an induced electric field formed between the second radiator L2 and the second reference ground 121 are opposite to each other. Therefore, at the first time point t1, as shown in FIG. 21D and FIG. 21E, a direction of a fifth electric field E5 induced in the second slot S2 between the first radiator L1 and the second reference ground 121 is from the first radiator L1 to the second reference ground 121.

In addition, as shown in FIG. 21A and FIG. 21B, at a same time point, for example, the foregoing first time point t1, because the surface of the second radiating branch 221 is negatively charged, a direction of the first electric field E1 in the middle gap G0 generated by exciting the second radiating branch 221 is from the second radiator L2 of the parasitic branch 241 to the second radiating branch 221. Because the surface of the second radiator L2 is negatively charged, a direction of a sixth electric field E6 in the middle gap G0 generated by inducing the second radiator L2 is from the second radiating branch 221 to the second radiator L2.

In this way, in the middle gap G0, because the direction of the first electric field E1 generated by exciting the second radiating branch 221 is opposite to the direction of the sixth electric field E6 generated by inducing the second radiator L2, some or all of the first electric field E1 is offset by the sixth electric field E6, and an electric field coupled by the second radiating branch 221 to the first radiating branch 211 of the first antenna 21 through the middle gap G0 and the parasitic branch 241 is reduced or eliminated.

Figure 21E:
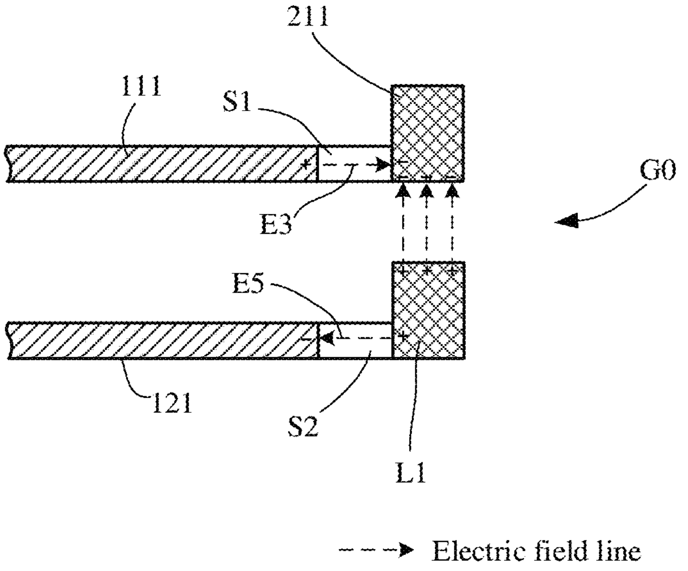
FIG. 21E is a sectional view of a part of a structure shown in FIG. 21A in an III-III direction, and shows an example of distribution directions of electric fields respectively generated by inducing a first antenna and a parasitic structure.

As shown in FIG. 21E, a direction of an electric field in the middle gap G0 generated by inducing the first radiator L1 is the same as the direction of the first electric field E1, and the first radiator L1 is close to the first radiating branch 211. Therefore, a remaining part that is not offset and that is of the first electric field E1 and the electric field in the middle gap G0 generated by inducing the first radiator L1 are jointly coupled to the first radiating branch 211. A seventh electric field E7 coupled on the first radiating branch 211 is shown in FIG. 21A. In this way, a current is induced on the first radiating branch 211, and a third electric field E3 is formed in the first slot S1 between the first radiating branch 211 and the first reference ground 111.

Based on the foregoing analysis, it may be learned that, at the first time point t1, as shown in FIG. 21C and FIG. 21E, a direction of the third electric field E3 induced by the first radiating branch 211 in the slot S1 between the first radiating branch 211 and the first reference ground 111 is from the first reference ground 111 to the first radiating branch 211.

It may be further learned from the foregoing analysis that, at a same time point, for example, the first time point t1, as shown in FIG. 21C to FIG. 21E, a direction of a fourth electric field E4 in the second slot S2 generated by inducing the second radiator L2 is the same as a direction of the second electric field E2 in the first slot S1 generated by inducing the second radiating branch 221 and the direction of the third electric field E3 in the first slot S1 generated by inducing the first radiating branch 211. The direction of the fifth electric field E5 in the second slot S2 generated by inducing the first radiator L1 is opposite to both the direction of the second electric field E2 in the first slot S1 generated by inducing the second radiating branch 221 and the direction of the third electric field E3 in the first slot S1 generated by inducing the first radiating branch 211. In the folded state, because the first radiating branch 211 overlaps the first radiator L1, and the first slot S1 is opposite to the second slot S2, some or all of the third electric field E3 is offset by the fifth electric field E5. This can reduce or eliminate energy coupled from the second radiating branch 221 to the first radiating branch 211.

A person skilled in the art may understand that a principle of electric field offset when the first antenna 21 is excited is the same as a principle of electric field offset when the second antenna 22 is excited. For technical details, refer to the foregoing related description in which the second antenna 22 is excited. The details are not described herein again.

In summary, it may be learned that the antenna system 203 provided in the third implementation of this application may suppress radiated energy on any one of the two same-band antennas from being coupled to the other antenna through the second reference ground 121 on the second body. This can effectively increase an isolation between the first antenna 21 and the second antenna 22 when the electronic device 100 is in the folded state.

FIG. 22A shows a diagram of simulation of electric field distribution formed in a first slot S1 between two same-band antennas included in the antenna system 203 shown in FIG. 19 and a first reference ground 111 on a first body 11 when the electronic device 100 is in a folded state and a second antenna 22 is excited. Through comparison of FIG. 14D and FIG. 22A, it may be learned that, after a large amount of energy of the electric field generated on the second antenna 22 is offset by an electric field generated by inducing the parasitic structure 24, and less energy is coupled to the first antenna 21.

FIG. 22B shows a schematic diagram of S-parameter curves of two same-band antennas included in the antenna system 203 when the electronic device 100 is in the folded state. It may be learned from FIG. 22B that an isolation of the two same-band antennas of the antenna system 203 in an operating band 0.8 GHz-0.9 GHz is below −20 dB. The isolation is relatively high.

In another form of implementing the third implementation, as shown in FIG. 23 and FIG. 24, a parasitic structure 24' is a slot antenna, and the slot antenna operates in a half-wavelength mode.

Specifically, a parasitic branch 241' of the slot antenna includes a first radiator L1' and a second radiator L2' that are respectively located on both sides of a middle of the parasitic branch 241'. The first radiator L1' is spaced apart from the second radiator L2' by a fifth gap G5. One end, away from the fifth gap G5 or the second radiator L2', of the first radiator L1' is grounded. One end, away from the fifth gap G5 or the first radiator L1', of the second radiator L2' is grounded.

A length of the first radiator L1' or the second radiator L2' may be a quarter of a wavelength corresponding to a resonant frequency of the parasitic structure 24, that is, a quarter of an operating wavelength of the two same-band antennas. In actual application, a length of the first radiator L1' may be adjusted by adjusting a grounding point of the first radiator L1' and a position of the fifth gap G5: and a length of the second radiator L2' may be adjusted by adjusting positions of the fifth gap G5 and a grounding point of the second radiator L2'. Conversely, a frequency range of resonance in the half-wavelength mode may also be adjusted by adjusting lengths of the first radiator L1' and the second radiator L2'.

When the slot antenna 24' is used as an active antenna, an operating mode of the slot antenna 24' is the same as a common mode (common mode, CM) slot antenna mode of a slot antenna described in Chinese Patent Application No. CN112751159A. For a specific principle, refer to detailed description of the CM slot antenna mode of the slot antenna in Chinese Patent Application No. CN112751159A. Details are not described herein. In this application, the slot antenna 24' is used as a passive parasitic structure, and performs magnetic field coupled feeding with an excited antenna of the two same-band antennas. An operating principle of the slot antenna 24' when used as a passive parasitic structure is similar to an operating principle of the slot antenna 24' when used as an active antenna. Refer to FIG. 25. When the slot antenna 24' performs coupled feeding with any one of the two same-band antennas to form resonance in a half-wavelength mode, directions of induced currents respectively generated on the first radiator L1' and the second radiator L2' are the same. A direction of an induced electric field generated in the second slot S2 between the first radiator L1' and the second reference ground 121 is opposite to a direction of an induced electric field generated in the second slot S2 between the second radiator L2' and the second reference ground 121.

In this application, an operating principle in which the antenna system 203 uses the slot antenna 24' as the parasitic structure is the same as the operating principle in which the linear antenna 24 is used as the parasitic structure. In the two operating principles, similar offset effect can be achieved on induced electric fields generated in the two same-band antennas. For technical details, refer to the foregoing description. The details are not described herein again.

In this application, any one or more of the first slot S1, the second slot S2, the first gap G1, the second gap G2, the third gap G3, the fourth gap G4, and the fifth gap G5 may be filled in with a non-conductive medium, for example, may be filled with polycarbonate (Polycarbonate, PC). In actual application, widths of the first slot 114, the second slot S2, the first gap G1, the second gap G2, the third gap G3, the fourth gap G4, and the fifth gap G5 may be set based on an actual situation. This is not limited in an implementation of this application.

In summary, for the antenna system 203 provided in this application, the two same-band antennas are disposed on a same side of the foldable electronic device 100, and a decoupling structure 23 is connected in series between the two same-band antennas. Therefore, the decoupling structure 23 is used to cut off a coupling path that is between the two same-band antennas and that passes through the first gap. This may effectively resolve a problem that a poor isolation exists between two same-band antennas when the electronic device 100 is in an unfolded state. For the antenna system 203, a ½ wavelength antenna structure, that is, a parasitic structure 24, is added on the other side of the electronic device 100. When the electronic device 100 is in the folded state, the parasitic structure 24 and the two same-band antennas are coupled to form resonance in a half-wavelength mode. A direction of an induced electric field formed between one side of a middle of the parasitic branch 241 of the parasitic structure 24 and the second reference ground 121 near the parasitic structure 24 and a direction of an induced electric field formed between the other side of the middle of the parasitic branch 241 of the parasitic structure 24 and the second reference ground 121 near the parasitic structure 24 are opposite to each other. The induced electric field may offset an electric field coupled from any one of the two same-band antennas to the other antenna, to suppress radiated energy on any one of the two same-band antennas from being coupled to the other antenna through the second reference ground 121 on the second body, and further increase an isolation between the first antenna 21 and the second antenna 22. This may effectively resolve a problem that a poor isolation exists between the two same-band antennas when the electronic device 100 is in a folded state. In this way, a high isolation exists between the two same-band antennas of the antenna system 203, and the two same-band antennas have ideal antenna performance when the electronic device 100 is in the unfolded state or folded state. This enables the electronic device 100 including the antenna system 203 to have a relatively good wireless communication function.

It should be noted that, in this application, a wavelength in a specific wavelength mode (such as a ½ wavelength mode, a ¼ wavelength mode, or the like) of an antenna may be a wavelength of a signal radiated by the antenna. For example, an antenna in the ½ wavelength mode may generate a resonance at a 2.4 GHz band. A wavelength in the ½ wavelength mode is a wavelength of a signal radiated by the antenna at the 2.4 GHz band. It should be understood that a wavelength of a radiated signal in the air may be calculated based on the following formula: Wavelength=Speed of light/Frequency, where the frequency is a frequency of the radiated signal. A wavelength of the radiated signal in a medium may be calculated based on the following formula: Wavelength=(Speed of light/$\sqrt{\varepsilon}$)/Frequency, where $\varepsilon$ is a relative dielectric constant of the medium, and the frequency is the frequency of the radiated signal.

The foregoing descriptions are merely some implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna system, applied to a foldable electronic device, wherein the foldable electronic device comprises a first body and a second body that are connected to each other and are capable of being folded or unfolded relative to each other, and the antenna system comprises:

two same-band antennas, wherein the two same-band antennas comprise a first antenna having a first radiating branch and a second antenna having a second radiating branch, and the first radiating branch and the second radiating branch are disposed on the first body and are spaced apart by a first gap;

a decoupling structure, connected across the first gap in series between the two same-band antennas, wherein the decoupling structure is a band-stop filter, and the band-stop filter comprises an inductance element or a combination of an inductor and a capacitor; and a parasitic structure disposed on the second body, wherein the parasitic structure is a linear antenna comprising a parasitic branch having a first radiator and a second radiator located on both sides of a middle of the parasitic branch, wherein the first radiator and the second radiator are an integral structure, and when the electronic device is in a folded state, the first radiator overlaps the first radiating branch and the second radiator overlaps the second radiating branch; and the parasitic structure is a ½ wavelength antenna structure, and a length of the parasitic branch is half of the operating wavelength of the two same-band antennas.

2. The antenna system according to claim 1, wherein when the electronic device is in the fully folded state, a middle of the parasitic branch is opposite to the first gap, and a distance from a projection of a center of the first gap on the parasitic branch to the middle of the parasitic branch is less than or equal to one-eighth of an operating wavelength of the two same-band antennas.

3. The antenna system according to claim 1, wherein the first radiating branch and the second radiating branch are separately spaced apart from a first reference ground on the first body by a first slot;

the parasitic branch is spaced apart from a second reference ground on the second body by a second slot; and when the electronic device is in the folded state, the first slot is opposite to the second slot.

4. The antenna system according to claim 3, wherein when the electronic device is in the folded state and any one of the two same-band antennas is operating, the parasitic structure is coupled to the operating antenna to form resonance in a half-wavelength mode, and directions of induced currents respectively generated on the first radiator and the second radiator are the same; and a direction of an induced electric field generated in the second slot between the first radiator and the second reference ground is opposite to a direction of an induced electric field generated in the second slot between the second radiator and the second reference ground.

5. The antenna system according to claim 4, wherein when the electronic device is in the folded state and any one of the two same-band antennas is operating, an electric field in the first slot generated by exciting the operating antenna and an electric field in the first slot generated by inducing the other of the two same-band antennas are electric fields in a same direction.

6. The antenna system according to claim 3, wherein the parasitic structure is a linear antenna, and the first radiator and the second radiator are an integral structure; and a length of the parasitic branch is half of the operating wavelength of the two same-band antennas.

7. The antenna system according to claim 4, wherein the parasitic structure is a linear antenna, and the first radiator and the second radiator are an integral structure; and a length of the parasitic branch is half of the operating wavelength of the two same-band antennas.

8. The antenna system according to claim 1, wherein the linear antenna further comprises two matching circuits respectively coupled to both ends of the parasitic branch, and the two matching circuits are configured to adjust a resonant frequency of the parasitic structure.

9. The antenna system according to claim 1, wherein the parasitic structure is a slot antenna, the first radiator and the second radiator are spaced apart by a gap, one end, away from the second radiator, of the first radiator is grounded, and one end, away from the first radiator, of the second radiator is grounded; and a length of the first radiator or the second radiator is a quarter of the operating wavelength of the two same-band antennas.

10. The antenna system according to claim 1, wherein the first radiating branch comprises a first coupling end adjacent to the first gap, and the second radiating branch comprises a second coupling end adjacent to the first gap;

the decoupling structure is connected in series between the first coupling end of the first radiating branch and the second coupling end of the second radiating branch; and the decoupling structure is configured to cut off a coupling path that is between the two same-band antennas and that passes through the first gap.

11. The antenna system according to claim 10, wherein the decoupling structure is a band-stop filter, and the band-stop filter comprises an inductance element or a combination of an inductor and a capacitor.

12. The antenna system according to claim 1, wherein the first antenna further comprises a first feed point and a first grounding point that are coupled to the first radiating branch, wherein a minimum distance from the first feed point to a center of the first gap is less than a minimum distance from the first grounding point to the center of the first gap; and the second antenna further comprises a second feed point and a second grounding point that are coupled to the second radiating branch, wherein a minimum distance from the second feed point to the center of the first gap is greater than a minimum distance from the second grounding point to the center of the first gap.

13. The antenna system according to claim 12, wherein the first antenna further comprises a first matching circuit coupled to the first feed point, and the first matching circuit is configured to implement impedance matching of the first antenna; and the second antenna further comprises a second matching circuit coupled to the second feed point, and the second matching circuit is configured to implement impedance matching of the second antenna.

14. The antenna system according to claim 13, wherein the second antenna further comprises a third matching circuit coupled to the second grounding point, and the third matching circuit is configured to implement impedance matching of the second antenna.

15. The antenna system according to claim 1, wherein the first body further comprises a first middle frame, the first middle frame is partially or entirely made of a metal material, and both the first radiating branch and the second radiating branch are parts of a structure of the first middle frame; and the second body further comprises a second middle frame, wherein the first middle frame overlaps the second middle frame when the electronic device is in the fully folded state; and the second middle frame is partially or entirely made of a metal material, and the parasitic branch is a part of a structure of the second middle frame.

16. A foldable electronic device, comprising:

a first body and a second body, wherein the first body and the second body are connected to each other and are capable of being folded or unfolded relative to each other; and an antenna system comprising:

two same-band antennas comprising a first antenna having a first radiating branch and a second antenna having a second radiating branch, wherein the first radiating branch and the second radiating branch are disposed on the first body and are spaced apart by a first gap;

a decoupling structure, connected across the first gap in series between the two same-band antennas, wherein the decoupling structure is a band-stop filter, and the band-stop filter comprises an inductance element or a combination of an inductor and a capacitor; and a parasitic structure disposed on the second body, wherein the parasitic structure is a linear antenna comprising a parasitic branch having a first radiator and a second radiator located on both sides of a middle of the parasitic branch, wherein the first radiator and the second radiator are an integral structure, and when the electronic device is in a folded state, the first radiator overlaps the first radiating branch and the second radiator overlaps the second radiating branch; and the parasitic structure is a ½ wavelength antenna structure, and a length of the parasitic branch is half of the operating wavelength of the two same-band antennas.

* * * * *